US012574171B2

(12) United States Patent
Taherzadeh Boroujeni et al.

(10) Patent No.: US 12,574,171 B2
(45) Date of Patent: *Mar. 10, 2026

(54) WAVEFORM SWITCHING FOR DOWNLINK TRANSMISSIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

This patent is subject to a terminal disclaimer.

(21) Appl. No.: 17/840,522

(22) Filed: Jun. 14, 2022

(65) Prior Publication Data

US 2023/0403110 A1    Dec. 14, 2023

(51) Int. Cl.
H04L 5/00          (2006.01)
(52) U.S. Cl.
CPC .......... H04L 5/0028 (2013.01); H04L 5/0007 (2013.01); H04L 5/0023 (2013.01)
(58) Field of Classification Search
CPC ... H04L 5/0028; H04L 5/0007; H04L 5/0023; H04L 1/0025; H04L 1/0028; H04L 1/0039; H04L 5/001; H04L 5/0053; H04L 5/0091; H04L 1/0003; H04L 1/1854; H04L 1/1887; H04L 5/0044; H04L 5/0048; H04L 1/0001; H04W 72/21; H04W 72/23; H04B 7/0452; H04B 7/00
USPC ........ 370/310, 328, 329, 338, 341, 345, 350
See application file for complete search history.

(56) References Cited

U.S. PATENT DOCUMENTS

| | | | | | |
|---|---|---|---|---|---|
| 10,667,244 | B2 * | 5/2020 | Luo | .......................... | H04L 5/001 |
| 2010/0027482 | A1 * | 2/2010 | Murakami | ............ | H04L 5/0037 |
| | | | | | 370/329 |
| 2020/0154428 | A1 * | 5/2020 | Takeda | ................. | H04L 27/2636 |
| 2020/0287684 | A1 * | 9/2020 | Shin | ...................... | H04L 5/0007 |
| 2022/0393926 | A1 * | 12/2022 | Cha | ........................ | H04L 5/0053 |

FOREIGN PATENT DOCUMENTS

CN          107017899 A  *  8/2017  ........... H04B 1/0475

* cited by examiner

*Primary Examiner* — Nimesh Patel
(74) *Attorney, Agent, or Firm* — Loza & Loza, LLP

(57) ABSTRACT

Aspects relate to transmission of a downlink signal. A network entity such as a base station may use different waveforms for downlink transmissions in different scenarios. In some examples, the network entity may send an indication of a waveform switch to a user equipment. In some examples, the indication may specify that a particular waveform is to be used for a downlink transmission and/or a particular waveform parameter is to be used for a downlink transmission.

25 Claims, 16 Drawing Sheets

900

900

1000

1100

1200

1400

Start

Obtain a first indication of a first type of waveform associated with a second apparatus ~1402

Obtain a downlink transmission based on the first type of waveform from the second apparatus ~1404

End

WAVEFORM SWITCHING FOR DOWNLINK TRANSMISSIONS

TECHNICAL FIELD

The technology discussed below relates generally to wireless communication and, more particularly, to dynamically switching the waveform to be used for transmitting a downlink signal.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station. A base station may schedule access to a cell to support access by multiple UEs.

For example, a base station may allocate different resources (e.g., time domain and frequency domain resources) to be used by different UEs operating within the cell. Thus, each UE may transmit information to the base station via one or more of these resources and/or the base station may transmit information to one or more of the UEs via one or more of these resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first apparatus may include a processing system. The processing system may be configured to obtain a first indication of a first type of waveform associated with a second apparatus. The processing system may also be configured to obtain a downlink transmission based on the first type of waveform from the second apparatus.

In some examples, a method for communication at a first apparatus is disclosed. The method may include obtaining a first indication of a first type of waveform associated with a second apparatus. The method may also include obtaining a downlink transmission based on the first type of waveform from the second apparatus.

In some examples, a first apparatus may include means for obtaining a first indication of a first type of waveform associated with a second apparatus. The first apparatus may also include means for obtaining a downlink transmission based on the first type of waveform from the second apparatus.

In some examples, a non-transitory computer-readable medium has stored therein instructions executable by a processing system of a first apparatus to obtain a first indication of a first type of waveform associated with a second apparatus. The computer-readable medium may also have stored therein instructions executable by the processing system of the first apparatus to obtain a downlink transmission based on the first type of waveform from the second apparatus.

In some examples, a first apparatus may include a processing system. The processing system may be configured to output, for transmission, a first indication of a first type of waveform associated with the first apparatus. The processing system may also be configured to output, for transmission, a downlink transmission based on the first type of waveform.

In some examples, a method for communication at a first apparatus is disclosed. The method may include outputting, for transmission, a first indication of a first type of waveform associated with the first apparatus. The method may also include outputting, for transmission, a downlink transmission based on the first type of waveform.

In some examples, a first apparatus may include means for outputting, for transmission, a first indication of a first type of waveform associated with the first apparatus. The first apparatus may also include means for outputting, for transmission, a downlink transmission based on the first type of waveform.

In some examples, a non-transitory computer-readable medium has stored therein instructions executable by a processing system of a first apparatus to output, for transmission, a first indication of a first type of waveform associated with the first apparatus. The computer-readable medium may also have stored therein instructions executable by the processing system of the first apparatus to output, for transmission, a downlink transmission based on the first type of waveform.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
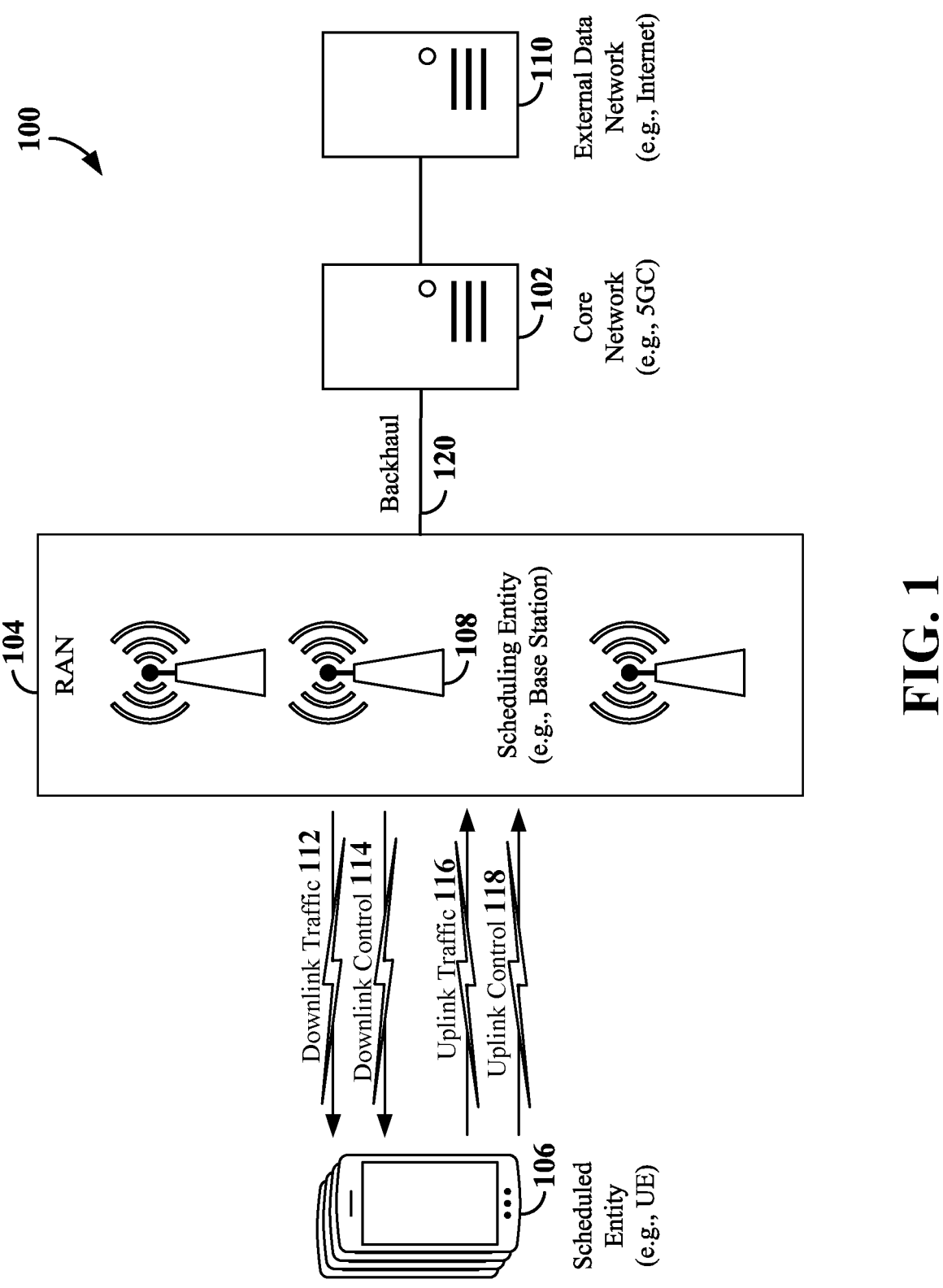
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to transmission of a downlink signal. A network entity such as a base station may elect to use different waveforms for a downlink transmission in different scenarios. For example, the network entity may use a first type of waveform for a first downlink transmission via a first frequency band and/or use a first sub-carrier spacing for the first downlink transmission. In addition, the network entity may use a second type of waveform for a second downlink transmission via a second frequency band (that is different from the first frequency band) and/or use a second sub-carrier spacing (that is different from the first sub-carrier spacing) for the second downlink transmission.

In some examples, the network entity may send an indication of a waveform switch to a user equipment. For example, the network entity may transmit a radio resource control (RRC) message, downlink control information (DCI), or a medium access control-control element (MAC-CE) that includes the indication to one or more UEs served by the network entity.

In some examples, the indication may specify that a particular waveform and/or waveform parameters are to be used for subsequent downlink transmissions. For example, the indication may specify whether transform precoding will be used for downlink transmissions. As another example, the indication may specify that a discrete Fourier transform-spread-orthogonal frequency division multiplexing (DFT-S-OFDM) waveform, a cyclic prefix-orthogonal frequency division multiplexing (CP-OFDM) waveform, or an orthogonal time frequency space (OTFS) waveform will be used for downlink transmissions. As a further example, the indication may specify that a particular type of filtering, type of pulse shaping, bandwidth expansion factor, or length of a cyclic prefix will be used for downlink transmissions.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
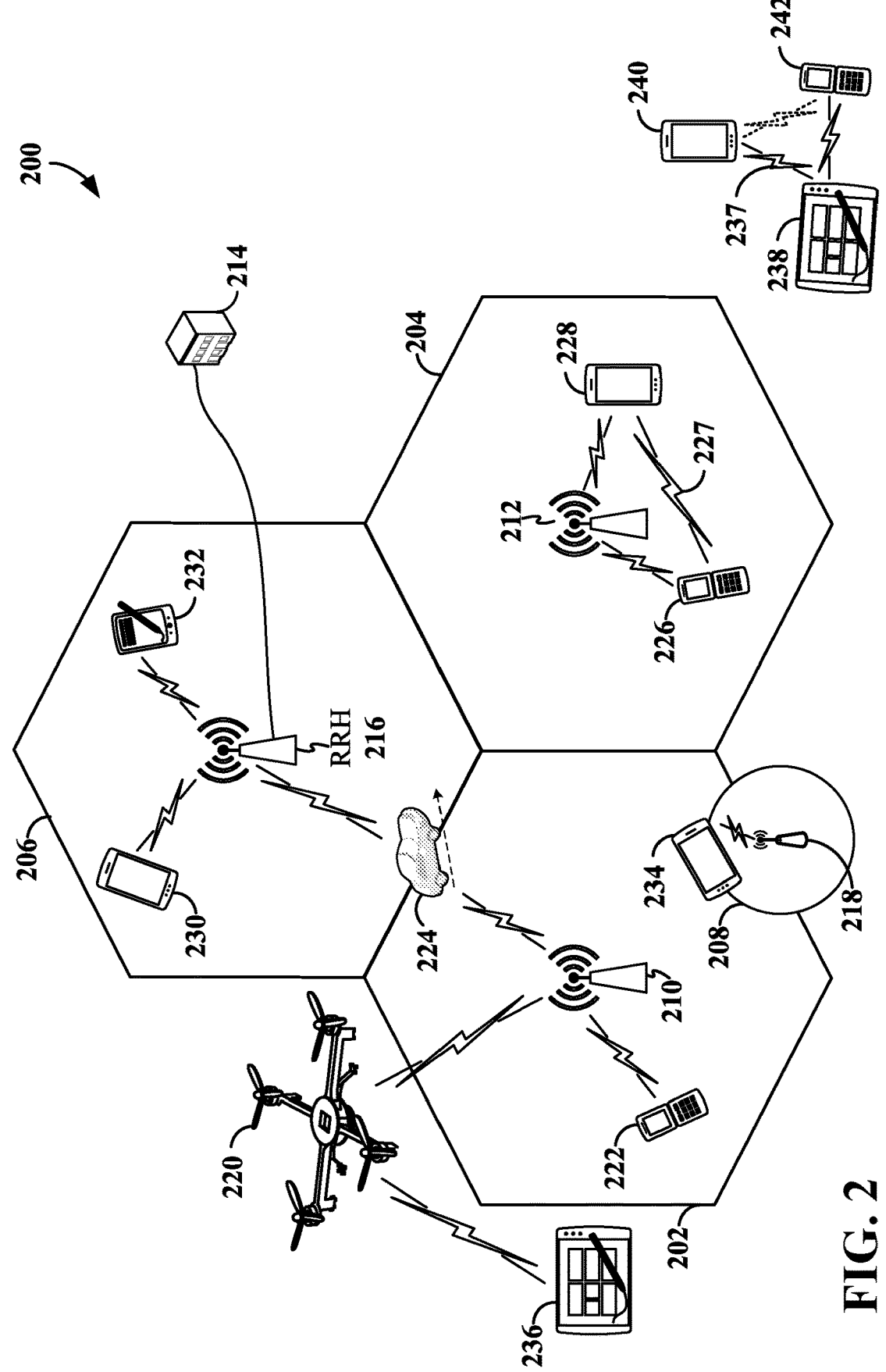
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation 1-R3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
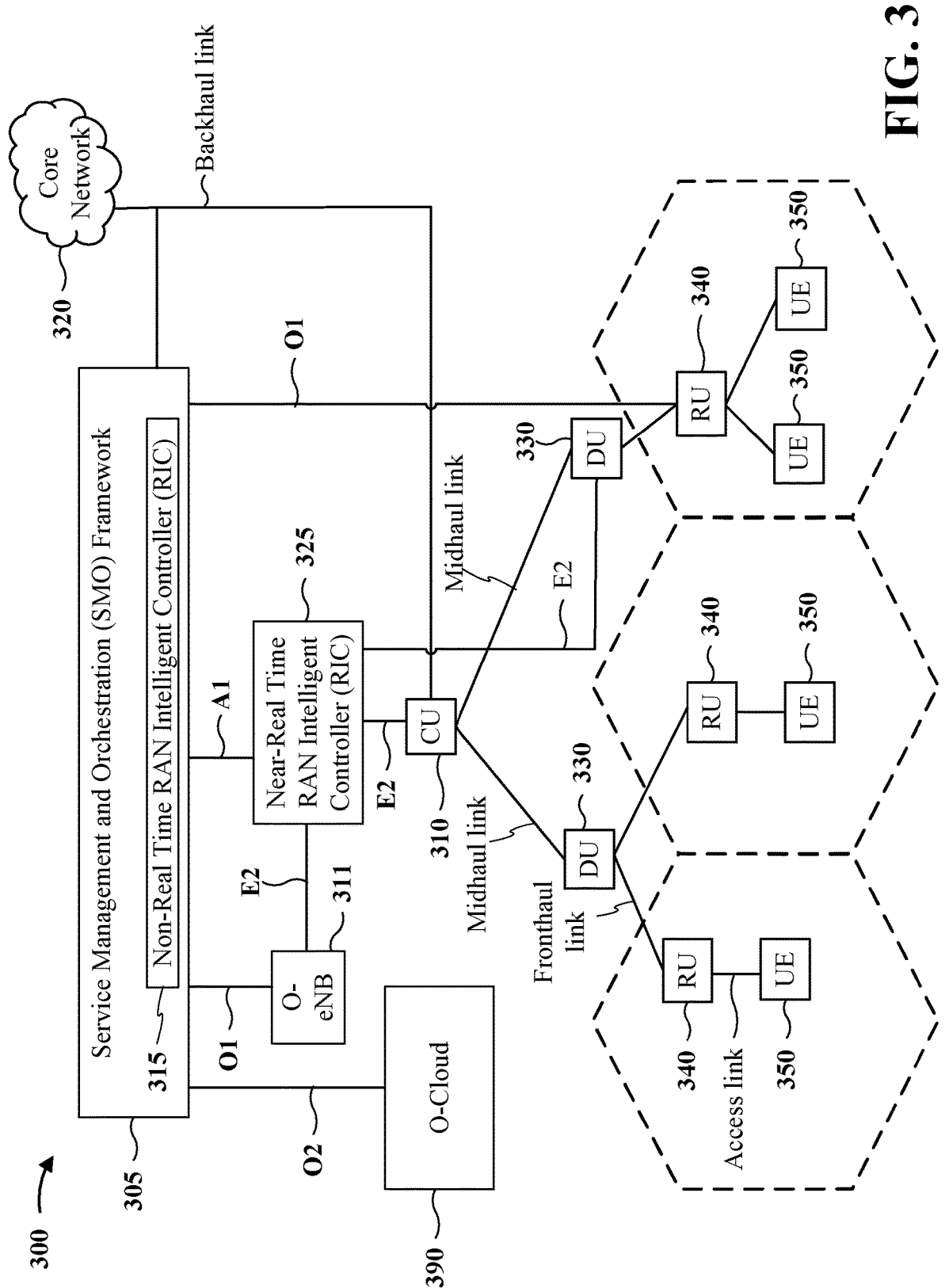
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3<sup>rd</sup> Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Figure 4:
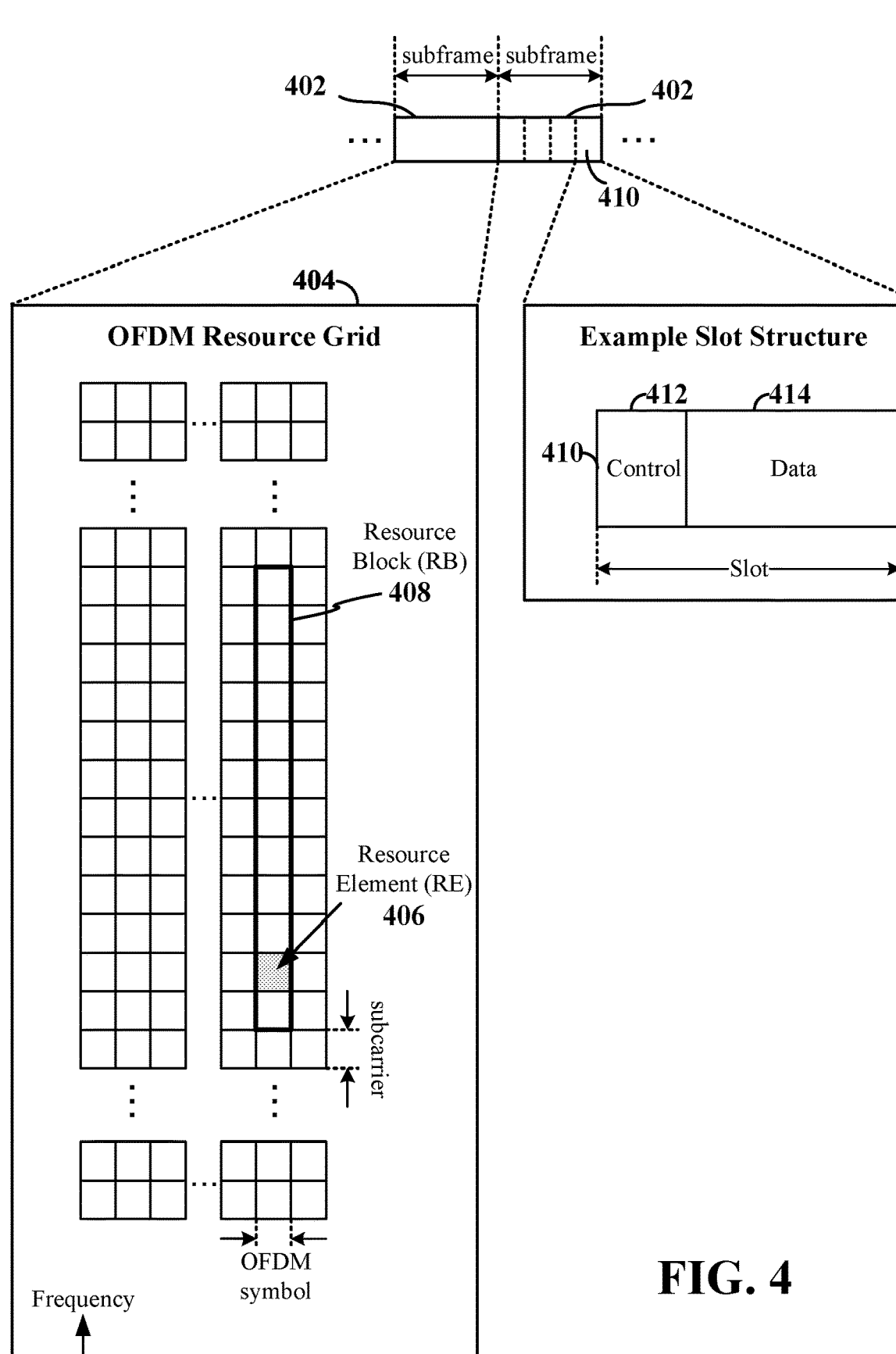
FIG. 4 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIB s and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
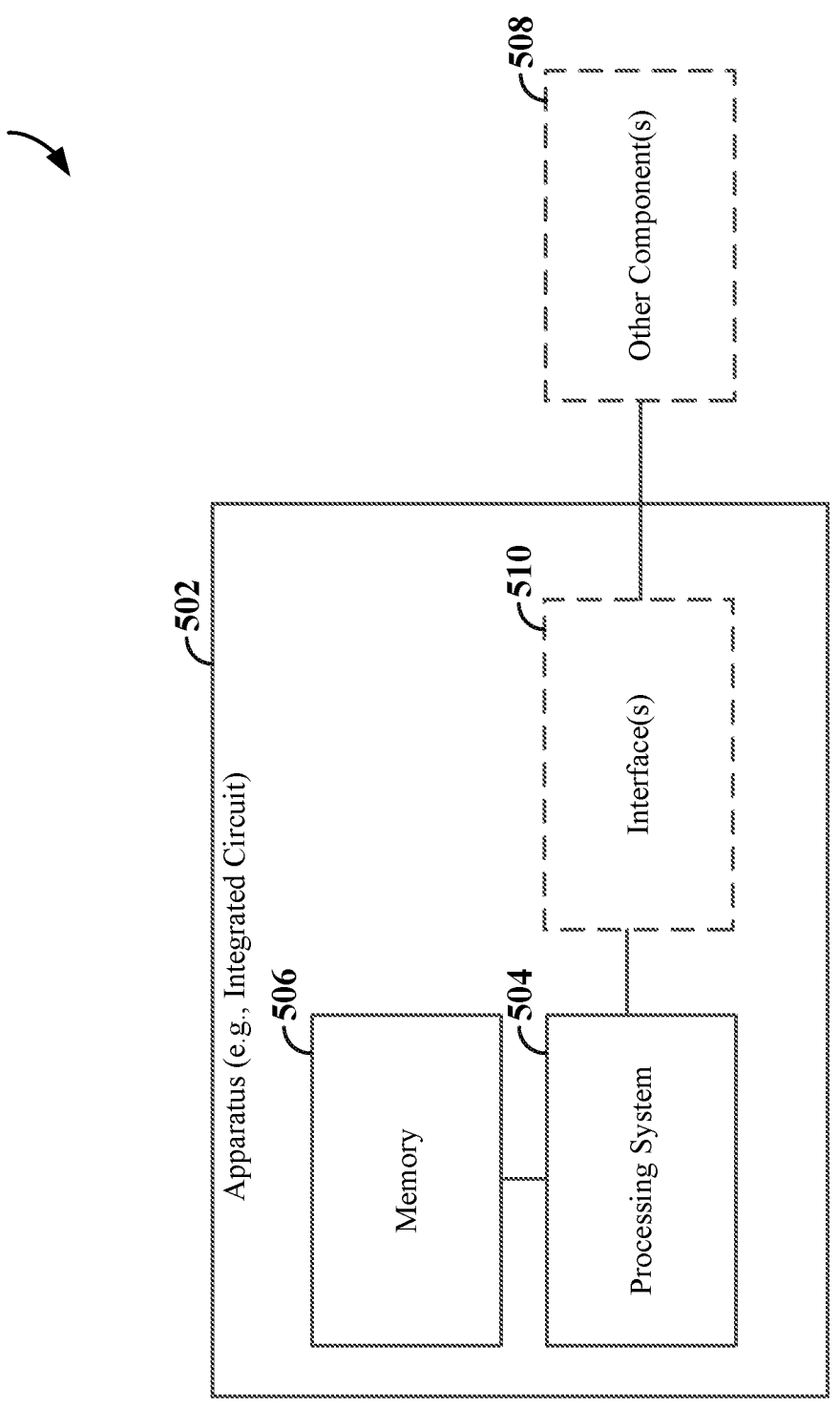
FIG. 5 is a schematic illustration of an example of an apparatus for communication according to some aspects.

FIG. 5 illustrates an example apparatus 500 according to certain aspects of the disclosure. In some examples, the apparatus 500 may be a BS, a UE, or some other type of wireless node (e.g., a node that utilizes wireless spectrum (e.g., the RF spectrum) to communicate with another node or entity). In some examples, the apparatus 500 may correspond to any of the apparatuses, UEs, scheduled entities, base stations (e.g., gNBs), scheduling entities, distributed units, control units, RAN nodes, or CN entities shown in any of FIGS. 1, 2, 3, 9-13, and 15. In some examples, the apparatus 500 may include any of the transmit chains shown in any of FIGS. 6-8.

The apparatus 500 includes an apparatus 502 (e.g., an integrated circuit) and, optionally, at least one other component 508. In some aspects, the apparatus 502 may be configured to operate in a wireless communication device (e.g., a UE, a BS, etc.) and to perform one or more of the operations described herein. The apparatus 502 includes a processing system 504, and a memory 506 coupled to the processing system 504. Example implementations of the processing system 504 are provided herein. In some examples, the processing system 504 of FIG. 5 may correspond to the processing system 1314 of FIG. 13. In some examples, the processing system 504 of FIG. 5 may correspond to the processing system 1514 of FIG. 15.

The processing system 504 is generally adapted for processing, including the execution of such programming stored on the memory 506. For example, the memory 506 may store instructions that, when executed by the processing system 504, cause the processing system 504 to perform one or more of the operations described herein.

In some implementations, the apparatus 502 communicates with at least one other component (e.g., a component 508 external to the apparatus 502) of the apparatus 500. To this end, in some implementations, the apparatus 502 may include at least one interface 510 (e.g., a send and/or receive interface) coupled to the processing system 504 for outputting and/or obtaining (e.g., sending and/or receiving) information (e.g., received information, generated information, decoded information, messages, etc.) between the processing system 504 and the other component(s) 508. In some implementations, the interface 510 may include an interface bus, bus drivers, bus receivers, buffers, other suitable circuitry, or a combination thereof. In some implementations, the interface 510 may include radio frequency (RF) circuitry (e.g., an RF transmitter and/or an RF receiver). In some implementations, the interface 510 may be configured to interface the apparatus 502 to one or more other components of the apparatus 500 (other components not shown in FIG. 5). For example, the interface 510 may be configured to interface the processing system 504 to a radio frequency (RF) front end (e.g., an RF transmitter and/or an RF receiver).

The apparatus 502 may communicate with other apparatuses in various ways. In cases where the apparatus 502 includes an RF transceiver (not shown in FIG. 5), the apparatus may transmit and receive information (e.g., a frame, a message, bits, etc.) via RF signaling. In some cases, rather than transmitting information via RF signaling, the apparatus 502 may have an interface to provide (e.g., output, send, transmit, etc.) information for RF transmission. For example, the processing system 504 may output information, via a bus interface, to an RF front end for RF transmission. Similarly, rather than receiving information via RF signaling, the apparatus 502 may have an interface to obtain information that is received by another apparatus. For example, the processing system 504 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Figure 6:
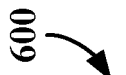
FIG. 6 is a schematic illustration of a first example of components of a transmit chain according to some aspects.
Figure 6:
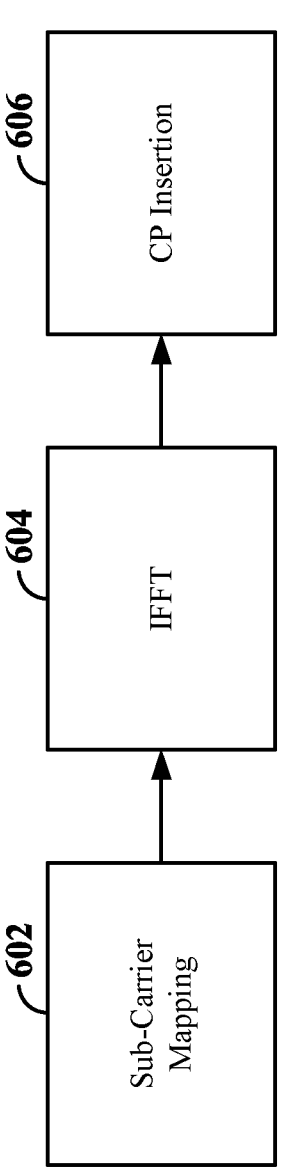
Figure 7:
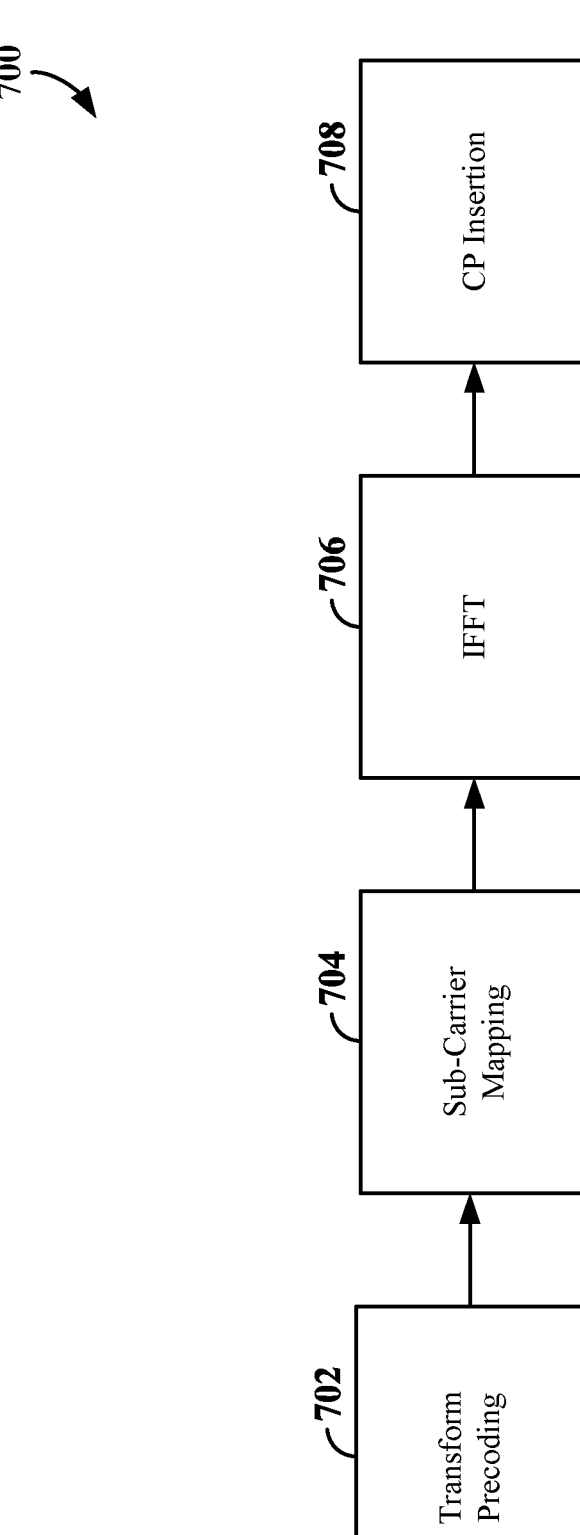
FIG. 7 is a schematic illustration of a second example of components of a transmit chain according to some aspects.

As discussed above, a wireless communication device may perform various processing (e.g., encoding, modulation, etc.) operations in conjunction with transmitting a transmission. FIGS. 6 and 7 illustrate example components of a wireless communication device that may be used for such transmit operations in different scenarios.

FIG. 6 illustrates various components that may be utilized in a transmit chain 600 to transmit a wireless transmission. The components illustrated in FIG. 6 may be used, for example, to transmit CP-OFDM signals. In some examples, the transmit chain 600 may be implemented in any of the apparatuses, UEs, scheduled entities, base stations (e.g., gNBs), scheduling entities, CUs. DUs, RUs, RAN nodes, or CN entities shown in any of FIGS. 1-3, 5, 9-13, and 15. The transmit chain 600 applies sub-carrier mapping 602 to codewords to be transmitted. After the sub-carrier mapping 602, an inverse fast Fourier transform (iFFT) 602 is applied, followed by cyclic prefix (CP) insertion 606. In some aspects, for CP-OFDM, the values that are transmitted each OFDM tone may be independent in frequency.

FIG. 7 illustrates various components that may be utilized in a transmit chain 700 to transmit a wireless transmission. The components illustrated in FIG. 7 may be used, for example, to transmit DFT-S-OFDM signals. In some examples, the transmit chain 700 may be implemented in any of the apparatuses, UEs, scheduled entities, base stations (e.g., gNBs), scheduling entities, CUs, DUs, RUs, RAN nodes, or CN entities shown in any of FIGS. 1-3, 5, 9-13, and 15. In contrast with the example of FIG. 6, in FIG. 7, the transmit chain 700 applies transform precoding 702 to codewords to be transmitted. Then, similar to FIG. 6, the transmit chain 700 performs sub-carrier mapping 704, an inverse fast Fourier transform (iFFT) 706, and CP insertion 708. In some aspects, for DFT-S-OFDM, the values that are transmitted each OFDM tone may be independent in time rather than frequency.

Some wireless communication systems may support dynamic switching between DFT-S-OFDM and CP-OFDM for uplink signals. For example, the use of uplink DFT-S-OFDM versus uplink CP-OFDM may be determined by enabling or disabling transform precoding via a configuration. For example, a RACH-ConfigCommon.msg3-transformPrecoding configuration may be used for random access, while a PUSCH-Config.transformPrecoding configuration may be used for PUSCH in RRC-connected mode.

The disclosure relates in some aspects to dynamically changing the waveform to be used for downlink transmissions. For example, a network entity such as a base station may elect to use different waveforms for a downlink transmission in different scenarios. In some examples, the network entity may use a first type of waveform for downlink transmissions via a first frequency band and/or use a first sub-carrier spacing for the downlink transmissions. For example, a DFT-S-OFDM may provide a lower peak to average power ratio (PAPR) when operating a higher frequencies (e.g., FR4 and higher) as compared to CP-OFDM. In some examples, the network entity may use a second type of waveform for downlink transmissions via a second frequency band (that is different from the first frequency band) and/or use a second sub-carrier spacing (that is different from the first sub-carrier spacing) for the downlink transmissions.

Figure 8:
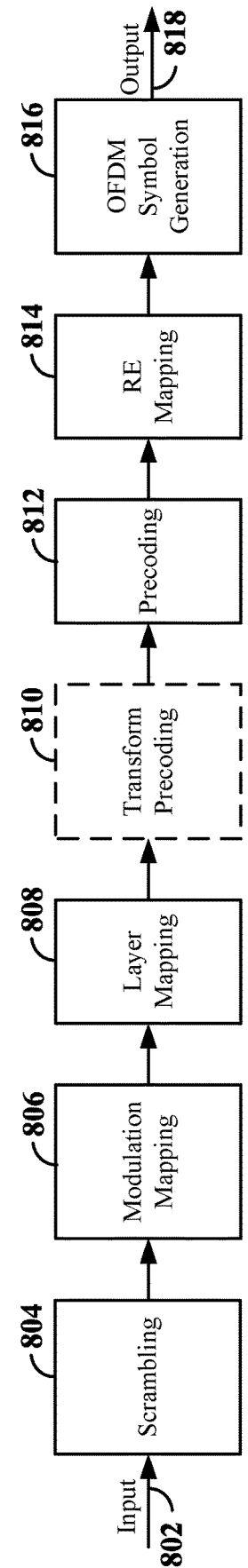
FIG. 8 is a schematic illustration of a third example of components of a transmit chain according to some aspects.

FIG. 8 illustrates an example of components of a transmit chain 800 that may be used, for example, to selectively transmit CP-OFDM signals or DFT-S-OFDM signals depending on whether transform precoding is applied to the codewords to be transmitted. In some examples, the transmit chain 600 may be implemented in any of the apparatuses, UEs, scheduled entities, base stations (e.g., gNBs), scheduling entities, CUs, DUs, RUs, RAN nodes, or CN entities shown in any of FIGS. 1-3, 5, 9-13, and 15.

The transmit chain 800 receives an input signal 802 (e.g., codewords) and, in succession, performs a scrambling function 804, a modulation mapping function 806, a layer mapping function 808, an optional transform precoding function 810, a precoding function 812, a resource element (RE) mapping function 814, and an OFDM signal generation function 816 to provide an output signal 818. In this example, the transform precoding function 810 is used in scenarios where DFT-S-OFDM signals are being transmitted, while the transform precoding function 810 is not used in scenarios where CP-OFDM signals are being transmitted.

In some examples, a network entity may indicate to a UE whether downlink transmissions will be transmitted with transform precoding or not (e.g., whether DFT-S-OFDM or CP-OFDM will be used for downlink data). In some examples, a network entity may indicate to a UE the type of transform precoding or other precoding that is used for a downlink transmission. In some examples, a network entity may indicate to a UE one or more waveform parameters (e.g., filtering, pulse shaping, bandwidth expansion factors, cyclic prefix length, etc.) to be used for a downlink transmission. In some aspects, filtering may be used to reduce interference on adjacent bands. In some aspects, pulse shaping may be used to reduce inter-symbol interference (ISI).

In some aspects, the use of different waveform parameters results in different waveforms. For example, a waveform with a short CP is a different type of waveform than a waveform with a long CP, a waveform with one type of shaping is a different type of waveform than a waveform with a different type of shaping, a waveform with one type of filtering is a different type of waveform than a waveform with a different type of filtering, a waveform with one type of bandwidth expansion factor is a different type of waveform than a waveform with a different type of bandwidth expansion factor, and so on.

The network entity may send this indication in different ways in different examples. In some examples, the indication may be via a semi-static configuration (e.g., via RRC signaling). In some examples, the indication may be via dynamic signaling (e.g., via UE-specific DCI and/or via group-common DCI and/or via a downlink MAC CE).

In some examples, for dynamic switching via group-common DCI or other types of switching, the indication may have different meaning for different UEs. In some examples, a UE may determine the meaning of the indication based on one or more configured parameters. For example, a network entity may send a first configuration to a first UE and send a second configuration to a second UE. In this case, based on the first configuration, the first UE may derive a first meaning of the indication, while, based on the second configuration, the second UE may derive a second meaning of the indication (different from the first meaning). As another example, different configurations may be specified (e.g., by a wireless communication standard such as a 3GPP standard) for different UEs (e.g., different types of UEs).

In some examples, the indication may specify that a UE is to switch to a secondary waveform. In this case, the first configuration may specify that the first UE is to use a first type of waveform in response to such an indication, while the second configuration may specify that the second UE is to use a second type of waveform (different from the first type of waveform) in response to such an indication. As one example, the first type of waveform may be a DFT-S-OFDM waveform while the second type of waveform may be a CP-OFDM waveform with alternate pulse shape. Other types of waveforms may be specified in other examples.

In some examples, the indication may specify that a UE is to switch to a secondary waveform parameter. In this case, the first configuration may specify that the first UE is to use a first type of waveform parameter in response to such an indication, while the second configuration may specify that the second UE is to use a second type of waveform parameter (different from the first type of waveform parameter) in response to such an indication. As one example, the first type of waveform parameter may be a first CP length waveform while the second type of waveform may be a second CP length waveform that is different from the first CP length waveform. Other types of waveform parameters may be specified in other examples.

Waveform switching for downlink transmissions may be linked to waveform switching for uplink transmissions. For example, upon receiving a dynamic indication of waveform switching (e.g., between CP-OFDM and DFT-S-OFDM) for uplink transmissions, a UE may automatically change the waveform type for downlink transmissions (e.g., according to a configuration). As another example, upon receiving a dynamic indication of waveform switching (e.g., between CP-OFDM and DFT-S-OFDM) for uplink transmissions, a UE may automatically change the filtering (e.g., in the context of filtered OFDM) and/or the pulse shape for downlink transmissions.

Waveform switching for downlink transmissions may be applied after a certain processing time after the indication is transmitted. For example, the network entity may wait a defined period of time after the indication is transmitted before using the indicated waveform for downlink transmissions. Similarly, the UE may wait a defined period of time after receiving the indication before using the indicated waveform for downlink transmissions (e.g., before attempting to decode waveforms of the indicated type). In some examples, the period of time is preconfigured (e.g., specified by a wireless communication standard such as a 3GPP standard). In some examples, the network entity sends an indication of the period of time to a UE. In some examples, a set of predefined periods of time may be configured at a UE (e.g., predefined or configured by a network entity) and the network entity may send an indication (e.g., an index) of the particular period of time to be used for a downlink transmission. In some examples, a network entity may select the period of time based on the capabilities of one or more UEs. For example, each UE server by a network entity may send capability information to the network entity that specifies whether that UE is capable of relatively quick waveform switching or not. In this case, the network entity may select a relatively short period of time for the processing time when all of the UEs are capable of relatively quick waveform switching. In contrast, the network entity may select a relatively short period of time for the processing time when a UE is not capable of relatively quick waveform switching.

In some examples, a network entity may determine whether to switch to a different downlink waveform depending on the frequency range and/or the subcarrier spacing to be used for the downlink transmission (e.g., according to standard specifications). For example, a network entity may elect to switch to a different downlink waveform (e.g., DFT-S-OFDM) for scenarios where the downlink transmission will use FR4 and above. As another example, a network entity may elect to switch to a different downlink waveform (e.g., DFT-S-OFDM) for scenarios where the downlink transmission will use a subcarrier spacing (SCS) greater than 120 kHz. A waveform switch may be based on other criteria in other examples.

Figure 9:
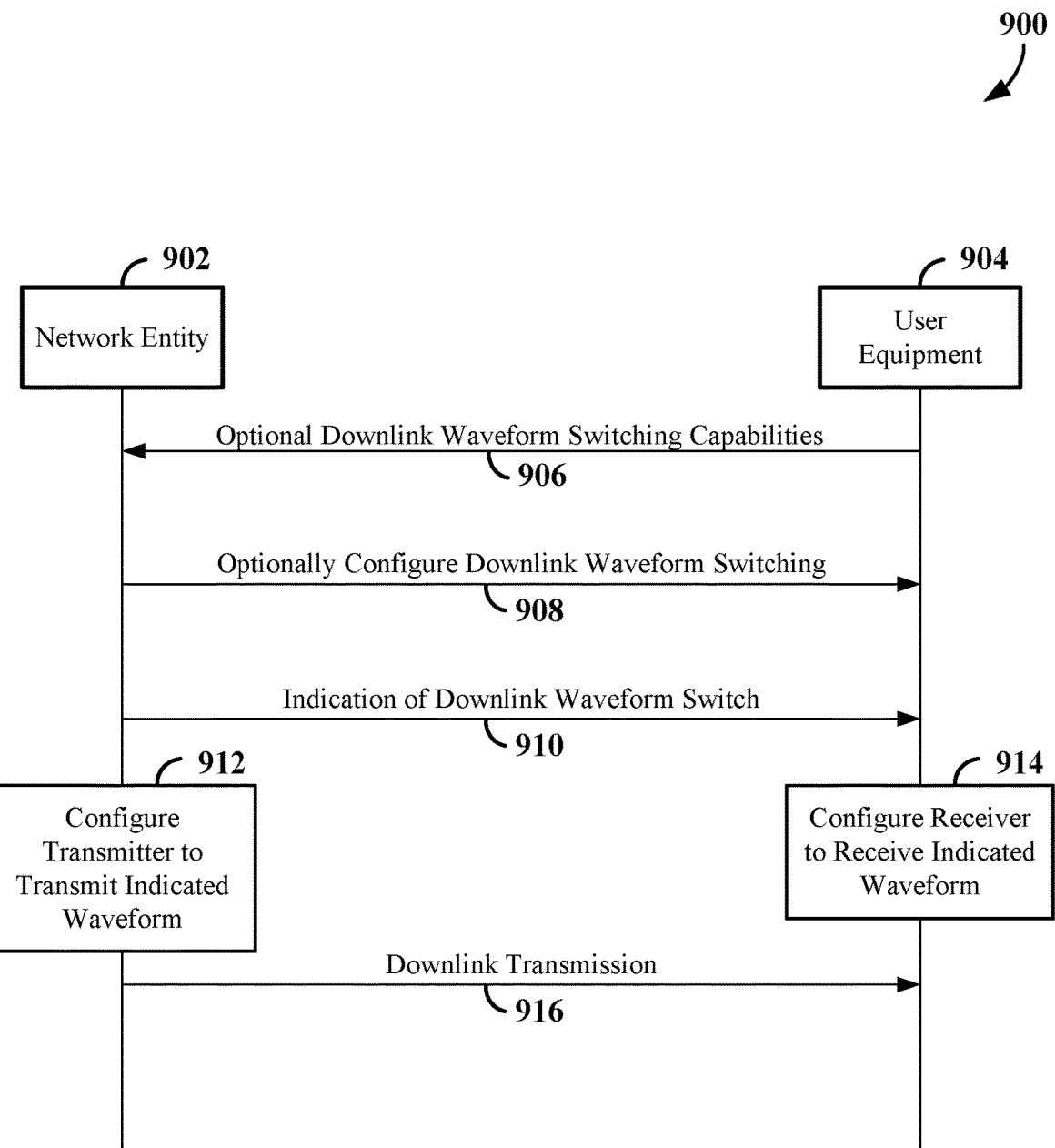
FIG. 9 is a signaling diagram illustrating an example of signaling an indication of a downlink waveform switch according to some aspects.

FIG. 9 is a signaling diagram 900 illustrating an example of indicating a downlink waveform switch in a wireless communication system including a network entity (e.g., a base station) 902 and a user equipment (UE) 904. In some examples, the network entity 902 may correspond to any of the base stations, CUs, DUs, RUs, or scheduling entities shown in any of FIGS. 1-3, 5, 10-12, and 15. In some examples, the user equipment 904 may correspond to any of the UEs or scheduled entities shown in any of FIGS. 1-3, 5, and 10-13.

At optional #906 of FIG. 9, the user equipment 904 may send capability information to the network entity 902. In some examples, the capability information may indicate whether the user equipment 904 supports downlink waveform switching.

At optional #908, the network entity 902 may configure the user equipment for downlink waveform switching. For example, the network entity 902 may send a configuration that specifies how the downlink waveform switching may be performed and/or indicated.

At #910, the network entity 902 sends an indication of a downlink waveform switch to the user equipment. For example, the network entity 902 may transmit an RRC message, a DCI, or a MAC-CE that carries one or more bits that indicate a switch (e.g., a bit value 1 indicates a switch).

At #912, the network entity 902 configures its transmitter to use the indicated waveform for transmitting downlink transmissions. For example, the network entity 902 may configure a transmit chain to use transform precoding (e.g., for DFT-S-OFDM). Other configurations (e.g., for other types of waveforms, for different types of waveform parameters, etc.) may be used in other examples.

At #914, the user equipment 904 configures its receiver to use the indicated waveform for receiving downlink transmissions. For example, the user equipment 904 may configure a receive chain to use inverse transform precoding (e.g., for DFT-S-OFDM). Other configurations (e.g., for other types of waveforms, for different types of waveform parameters, etc.) may be used in other examples.

At #916, the network entity 902 transmit the downlink transmission to the user equipment 904. This downlink transmission will be based on the waveform indicated at #910.

Figure 10:
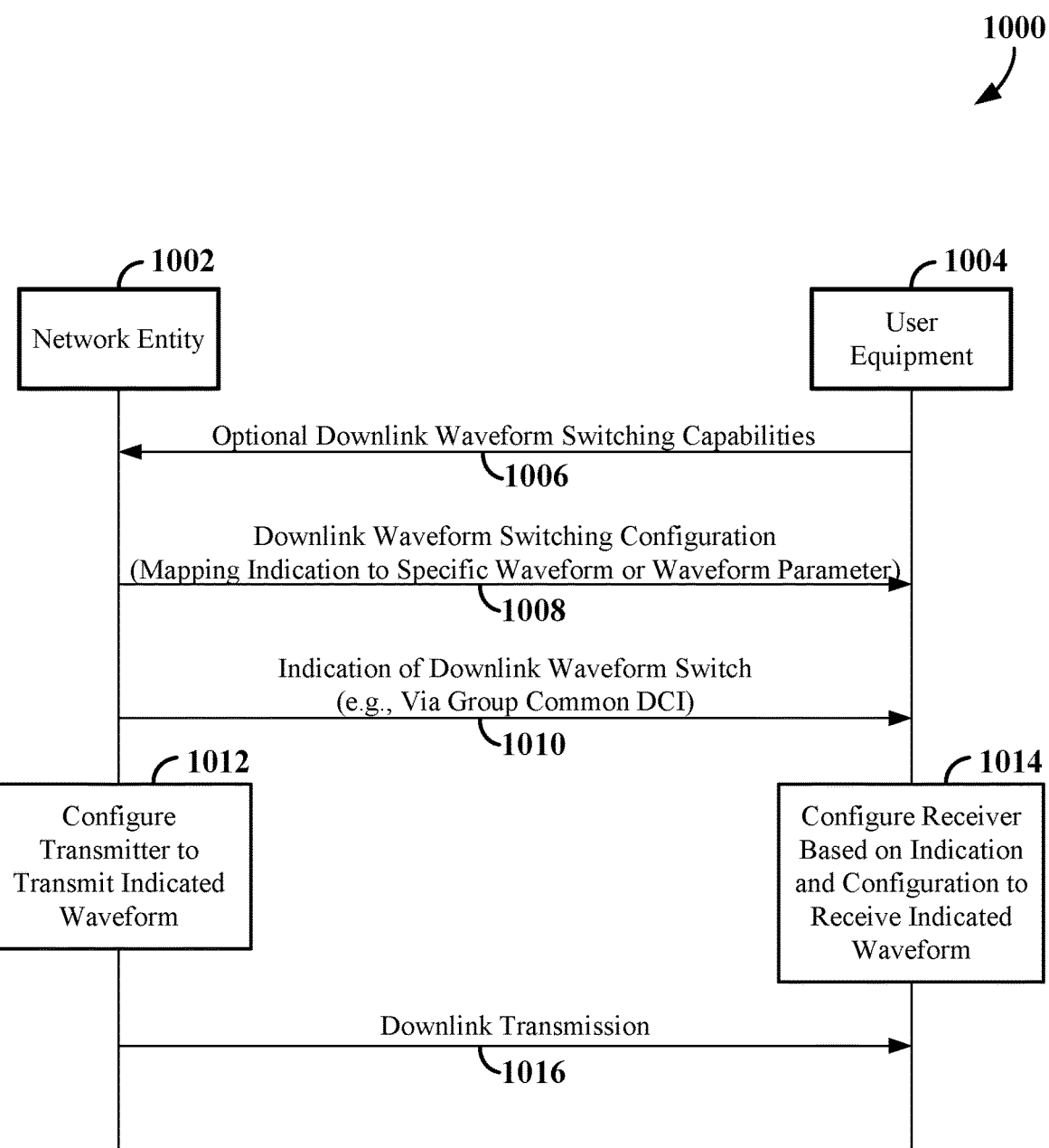
FIG. 10 is a signaling diagram illustrating an example of identifying a downlink waveform based on a configuration according to some aspects.

FIG. 10 is a signaling diagram 1000 illustrating an example of signaling a configuration for a downlink waveform switch in a wireless communication system including a network entity (e.g., a base station) 1002 and a user equipment (UE) 1004. In some examples, the network entity 1002 may correspond to any of the base stations, CUs, DUs, RUs, or scheduling entities shown in any of FIGS. 1-3, 5, 9, 11-12, and 15. In some examples, the user equipment 1004 may correspond to any of the UEs or scheduled entities shown in any of FIGS. 1-3, 5, and 9, 11-13.

At optional #1006 of FIG. 10, the user equipment 1004 may send capability information to the network entity 1002. In some examples, the capability information may indicate whether the user equipment 1004 has been configured for downlink waveform switching.

At optional #1008, the network entity 1002 may configure the user equipment for downlink waveform switching. For example, the network entity 1002 may send a configuration that specifies how to map a waveform switch indication to a particular waveform and/or a particular waveform parameter (or a set of waveform parameters).

At #1010, the network entity 1002 sends an indication of a downlink waveform switch to the user equipment. For example, the network entity 1002 may transmit an RRC message, a DCI, or a MAC-CE that carries one or more bits that indicate a switch (e.g., a bit value 1 indicates a switch).

In some examples, the network entity 1002 may send a group common DCI that includes an indication of a downlink waveform switch. For example, the group common DCI may be for a set of UEs (including the user equipment 1004) that are being served by the network entity 1002.

At #1012, the network entity 1002 configures its transmitter to use the indicated waveform for transmitting downlink transmissions. For example, the network entity 1002 may configure a transmit chain to use transform precoding (e.g., for DFT-S-OFDM). Other configurations (e.g., for other types of waveforms, for different types of waveform parameters, etc.) may be used in other examples.

At #1014, the user equipment 1004 configures its receiver to use the indicated waveform for receiving downlink transmissions. For example, the network entity 1002 may configure a receive chain to use inverse transform precoding (e.g., for DFT-S-OFDM). Other configurations (e.g., for other types of waveforms, for different types of waveform parameters, etc.) may be used in other examples.

In the example of FIG. 10, the user equipment 1004 may determine the particular waveform and/or waveform parameter(s) to be used for the downlink transmission based on both the indication received at #1010 and the configuration received at #1008. For example, the configuration may specify, for the user equipment 1004 (or for a set of UEs), the particular waveform and/or waveform parameter indicated by a particular indication (e.g., an indication to switch to a secondary waveform parameter).

At #1016, the network entity 1002 transmit the downlink transmission to the user equipment 1004. This downlink transmission will be based on the waveform indicated at #1010.

Figure 11:
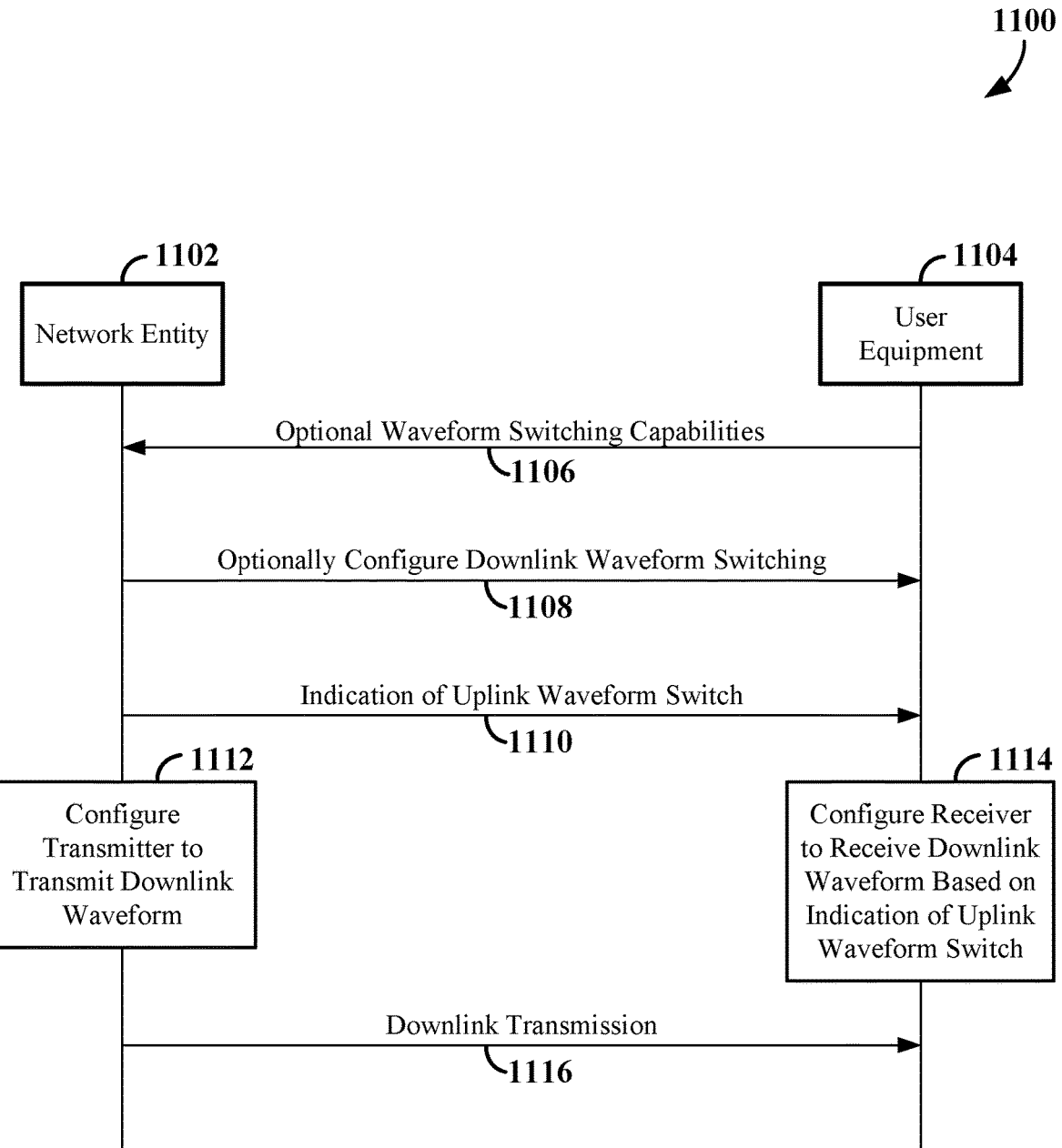
FIG. 11 is a signaling diagram illustrating an example of switching a downlink waveform based on an uplink waveform switch according to some aspects.

FIG. 11 is a signaling diagram 1100 illustrating an example of indicating an uplink waveform switch in a wireless communication system including a network entity (e.g., a base station) 1102 and a user equipment (UE) 1104. In some examples, the network entity 1102 may correspond to any of the base stations, CUs, DUs, RUs, or scheduling entities shown in any of FIGS. 1-3, 5, 9, 10, 12, and 15. In some examples, the user equipment 1104 may correspond to any of the UEs or scheduled entities shown in any of FIGS. 1-3, 5, 9, 10, 12, and 13.

At optional #1106 of FIG. 11, the user equipment 1104 may send capability information to the network entity 1102. In some examples, the capability information may indicate whether the user equipment 1104 supports downlink waveform switching linked to uplink waveform switching.

At optional #1108, the network entity 1102 may configure the user equipment for downlink waveform switching. For example, the network entity 1102 may send a configuration that specifies whether and/or how downlink waveform switching is linked to uplink waveform switching. In some examples, the user equipment 1004 may instead be preconfigured (e.g., when the user equipment 1004 is provisioned to use a network) to support downlink waveform switching linked to uplink waveform switching.

At #1110, the network entity 1102 sends an indication of an uplink waveform switch to the user equipment. For example, the network entity 1102 may transmit an RRC message, a DCI, or a MAC-CE that carries one or more bits that indicate a switch (e.g., a bit value 1 indicates a switch).

At #1112, the network entity 1102 configures its transmitter to use a new waveform for transmitting downlink transmissions in conjunction with the uplink waveform switch. For example, the network entity 1102 may configure a transmit chain to use transform precoding (e.g., for DFT-S-OFDM). Other configurations (e.g., for other types of waveforms, for different types of waveform parameters, etc.) may be used in other examples.

At #1114, upon receiving the indication of #1110, the user equipment 1104 configures its receiver to use a new waveform for receiving downlink transmissions (e.g., a particular downlink waveform that configured as being associated with a particular uplink waveform switch). For example, the network entity 1102 may configure a receive chain to use inverse transform precoding (e.g., for DFT-S-OFDM). Other configurations (e.g., for other types of waveforms, for different types of waveform parameters, etc.) may be used in other examples.

At #1116, the network entity 1102 transmits the downlink transmission to the user equipment 1104. In some examples, this downlink transmission will be based on the waveform indicated at #1110.

Figure 12:
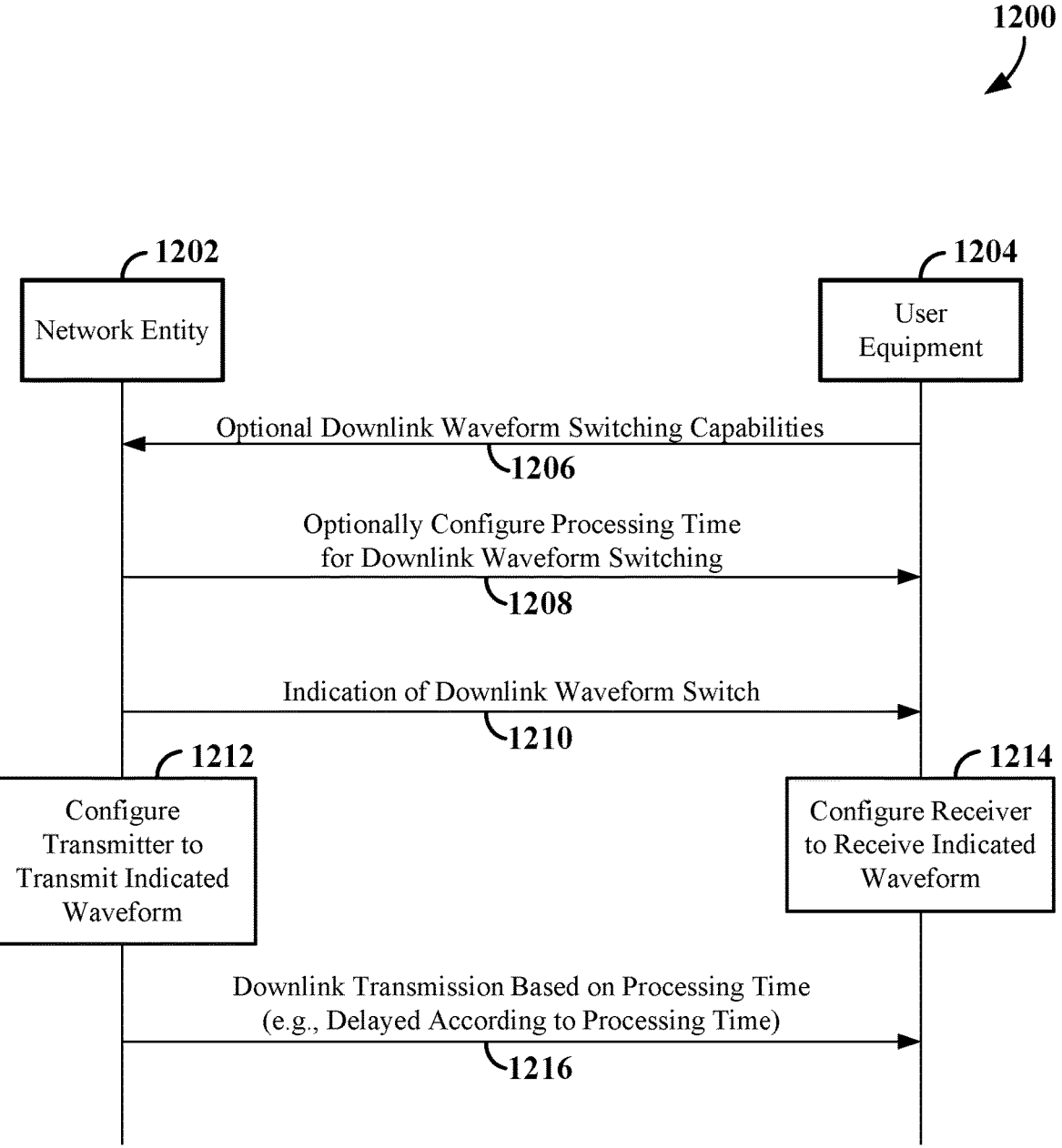
FIG. 12 is a signaling diagram illustrating an example of signaling based on a processing time for a downlink waveform switch according to some aspects.

FIG. 12 is a signaling diagram 1200 illustrating an example of signaling based on a processing time for a downlink waveform switch in a wireless communication system including a network entity (e.g., a base station) 1202 and a user equipment (UE) 1204. In some examples, the network entity 1202 may correspond to any of the base stations, CUs, DUs, RUs, or scheduling entities shown in any of FIGS. 1-3, 5, 10, 11, and 15. In some examples, the user equipment 1204 may correspond to any of the UEs or scheduled entities shown in any of FIGS. 1-3, 5, 10, 11, and 13.

At optional #1206 of FIG. 12, the user equipment 1204 may send capability information to the network entity 1202. In some examples, the capability information may indicate whether the user equipment 1204 supports relatively fast downlink waveform switching times or relatively slow downlink waveform switching times. In some examples, the capability information may specify a particular downlink waveform switching time (e.g., a quantity of slots).

At optional #1208, the network entity 1202 may configure the user equipment for downlink waveform switching. For example, the network entity 1202 may send a configuration that specifies one or more predefined downlink switching times.

At #1210, the network entity 1202 sends an indication of a downlink waveform switch to the user equipment. For example, the network entity 1202 may transmit an RRC message, a DCI, or a MAC-CE that carries one or more bits that indicate a switch (e.g., a bit value 1 indicates a switch).

At #1212, the network entity 1202 configures its transmitter to use the indicated waveform for transmitting downlink transmissions. For example, the network entity 1202 may configure a transmit chain to use transform precoding (e.g., for DFT-S-OFDM). Other configurations (e.g., for other types of waveforms, for different types of waveform parameters, etc.) may be used in other examples.

At #1214, the user equipment 1204 configures its receiver to use the indicated waveform for receiving downlink transmissions. For example, the network entity 1202 may configure a receive chain to use inverse transform precoding (e.g., for DFT-S-OFDM). Other configurations (e.g., for other types of waveforms, for different types of waveform parameters, etc.) may be used in other examples.

At #1216, the network entity 1202 transmit the downlink transmission to the user equipment 1204. This downlink transmission will be delayed based on the configured processing time (e.g., preconfigured by a standard, or configured by the network entity 1202).

Figure 13:
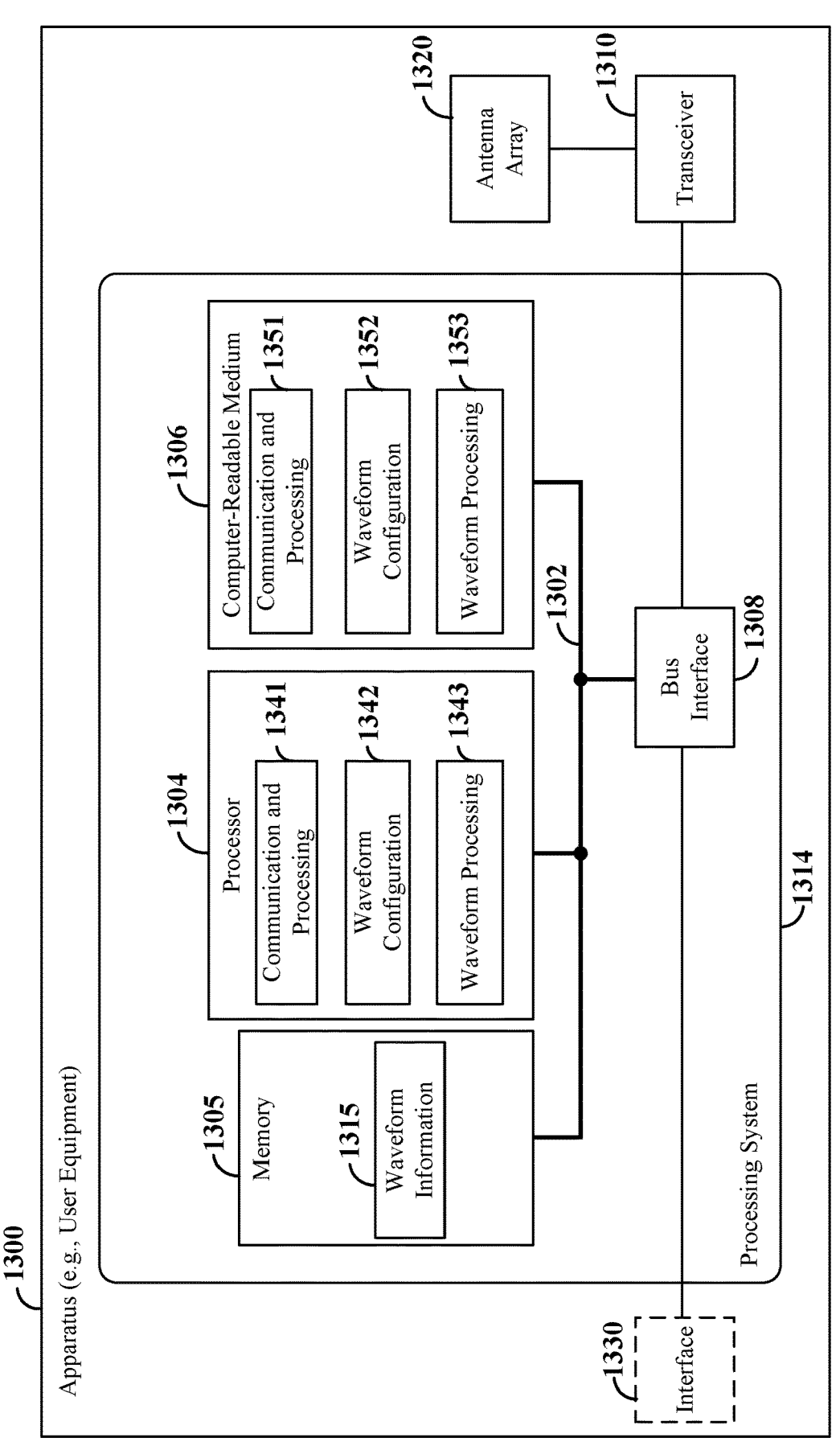
FIG. 13 is a block diagram conceptually illustrating an example of a hardware implementation for an apparatus (e.g., a user equipment) employing a processing system according to some aspects.

FIG. 13 is a block diagram illustrating an example of a hardware implementation for an apparatus 1300 employing a processing system 1314. For example, the apparatus 1300 may be a device configured to wirelessly communicate with a network entity, as discussed in any one or more of FIGS. 1-12. In some implementations, the apparatus 1300 may correspond to any of the UEs or scheduled entities shown in any of FIGS. 1-3 3, 5, and 9-12.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1300 may be configured to perform any one or more of the functions described herein. That is, the processor 1304, as utilized in the apparatus 1300, may be used to implement any one or more of the processes and procedures described herein.

The processor 1304 may in some instances be implemented via a baseband or modem chip and in other implementations, the processor 1304 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302, a transceiver 1310 and an antenna array 1320 and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the apparatus 1300 or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store waveform information 1315 (e.g., waveform types and/or waveform parameters) used by the processor 1304 for the communication operations described herein.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1300 may be configured to perform one or more of the operations described herein (e.g., as described above in conjunction with FIGS. 1-12 and as described below in conjunction with FIG. 14). In some aspects of the disclosure, the processor 1304, as utilized in the apparatus 1300, may include circuitry configured for various functions.

The processor 1304 may include communication and processing circuitry 1341. The communication and processing circuitry 1341 may be configured to communicate with a network entity, such as a gNB. The communication and processing circuitry 1341 may be configured to communicate with a base station and one or more other wireless communication devices over a common carrier shared between a cellular (e.g., Uu) interface and a sidelink (e.g., PC5) interface. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains (e.g., one chain to communicate with a base station and another chain to communicate with a sidelink device). The communication and processing circuitry 1341 may further be configured to execute communication and processing software 1351 included on the computer-readable medium 1306 to implement one or more functions described herein.

In some implementations where the communication involves obtaining (e.g., receiving) information, the communication and processing circuitry 1341 may obtain information from a component of the apparatus 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may receive one or more of signals, messages, SCIs, feedback, other information, or any combination thereof. In some examples, the communication and processing circuitry 1341 may receive information via one or more of a PSCCH, a PSSCH, a PSFCH, some other type of channel, or any combination thereof. In some examples, the communication and processing circuitry 1341 may include functionality for a means for receiving. In some examples, the communication and processing circuitry 1341 may include functionality for a means for decoding. In some examples, the communication and processing circuitry 1341 may include functionality for a means for receiving an indication (e.g., an indication of a type of waveform, an indication of a waveform switch, etc., as discussed herein). In some examples, the communication and processing circuitry 1341 may include functionality for a means for receiving a downlink transmission. In some examples, the communication and processing circuitry 1341 may include functionality for a means for obtaining an RRC message (e.g., by receiving information on a PDSCH), a MAC-CE (e.g., by receiving information on a PDSCH), or DCI (e.g., by receiving information on a PDCCH).

In some implementations where the communication involves outputting (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may send one or more of signals, messages, SCIs, feedback, other information, or any combination thereof. In some examples, the communication and processing circuitry 1341 may send information via one or more of a PSCCH, a PSSCH, a PSFCH, some other type of channel, or any combination thereof. In some examples, the communication and processing circuitry 1341 may include functionality for a means for outputting uplink information and/or sidelink information. In some examples, the communication and processing circuitry 1341 may include functionality for a means for encoding. In some examples, the communication and processing circuitry 1341 may include functionality for a means for transmitting (e.g., transmitting uplink information, capability information, etc.).

The processor 1304 may include waveform configuration circuitry 1342 configured to perform waveform configuration-related operations as discussed herein (e.g., one or more of the operations described above in conjunction with FIGS. 8-12). The waveform configuration circuitry 1342 may be configured to execute waveform configuration software 1352 included on the computer-readable medium 1306 to implement one or more functions described herein.

The waveform configuration circuitry 1342 may include functionality for a means for obtaining an indication (e.g., as described above in conjunction with FIGS. 8-12). For example, the waveform configuration circuitry 1342 may receive an RRC message, a DCI, or a MAC-CE including the indication.

The waveform configuration circuitry 1342 may include functionality for a means for switching to use of a particular type of waveform (e.g., as described above in conjunction with FIGS. 8-12). For example, in response to a received indication and/or based on a configuration, the waveform configuration circuitry 1342 may configure a transmit chain to receive DFT-S-OFDM waveforms, CP-OFDM waveforms, or other waveforms as discussed herein.

The waveform configuration circuitry 1342 may include functionality for a means for identifying a particular waveform or waveform parameter (e.g., as described above in conjunction with FIGS. 8-12). For example, in response to a received indication (e.g., in a group common DCI) and based on a configuration, the waveform configuration circuitry 1342 may determine that subsequent downlink transmissions will use DFT-S-OFDM waveforms, CP-OFDM waveforms, or other waveforms as discussed herein.

The waveform configuration circuitry 1342 may include functionality for a means for obtaining a configuration (e.g., as described above in conjunction with FIGS. 8-12). For example, the waveform configuration circuitry 1342 may receive an RRC message or a MAC-CE including a configuration for identifying a type of waveform or waveform parameter.

The processor 1304 may include waveform processing circuitry 1343 configured to perform waveform processing-related operations as discussed herein (e.g., one or more of the operations described above in conjunction with FIGS. 8-12). The waveform processing circuitry 1343 may be configured to execute waveform processing software 1353 included on the computer-readable medium 1306 to implement one or more functions described herein.

The waveform processing circuitry 1343 may include functionality for a means for obtaining a downlink transmission (e.g., as described above in conjunction with FIGS. 8-12). For example, the waveform processing circuitry 1343 may receive downlink data via a PDSCH.

The waveform processing circuitry 1343 may include functionality for a means for commencing using a type of waveform (e.g., as described above in conjunction with FIGS. 8-12). For example, the waveform processing circuitry 1343 may receive downlink data at a time (e.g., a slot) that is based on processing delay period.

Figure 14:
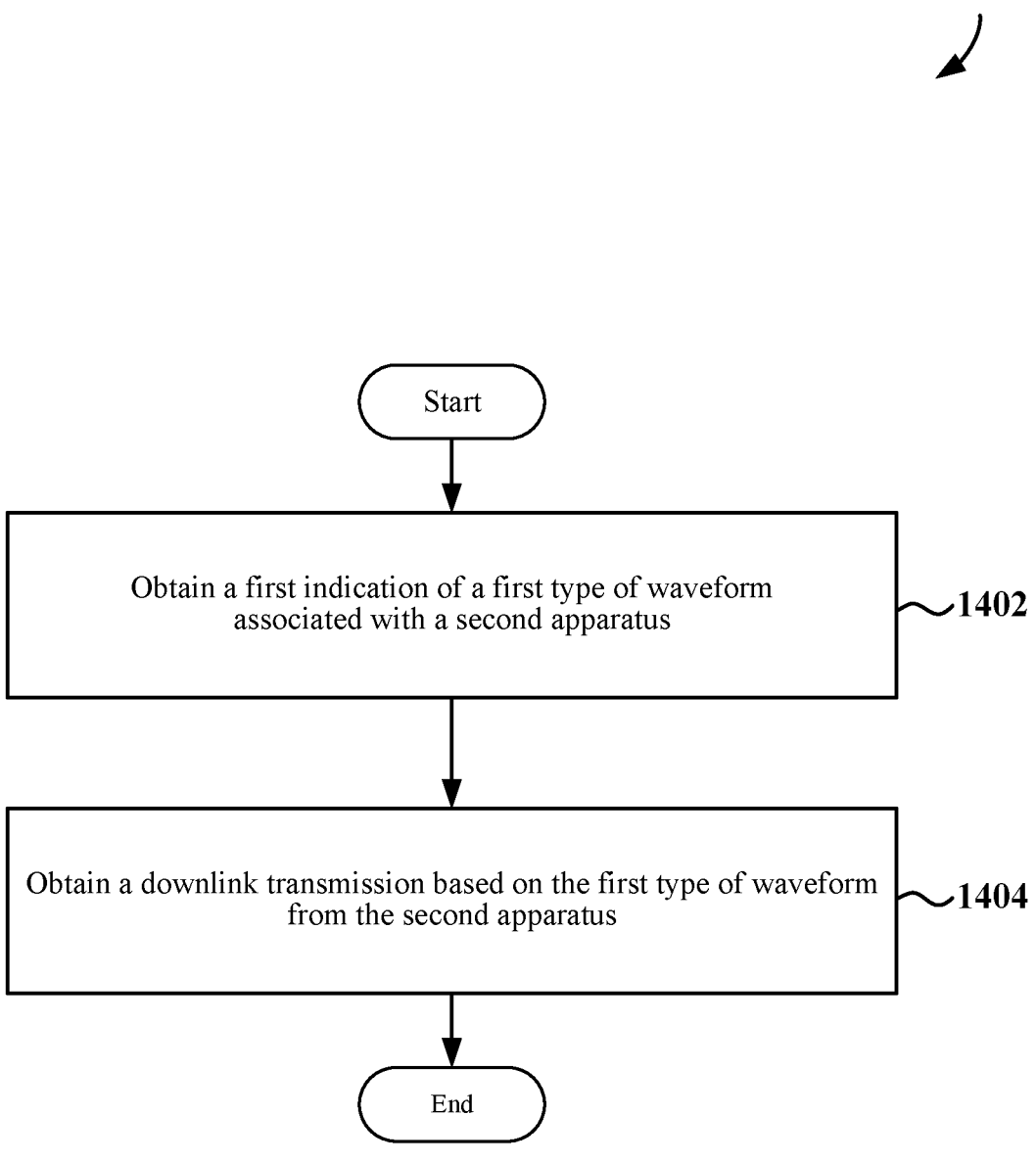
FIG. 14 is a flow chart illustrating an example wireless communication method involving obtaining an indication of a type of waveform according to some aspects.

FIG. 14 is a flow chart illustrating an example method 1400 for a user equipment in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the apparatus 1300 illustrated in FIG. 13. In some examples, the method 1400 may be carried out by any suitable apparatus or means for carrying out the functions or algorithm described below.

At block 1402, a user equipment may obtain a first indication of a first type of waveform associated with a second apparatus. In some examples, the waveform configuration circuitry 1342, shown and described in FIG. 13, may provide a means to obtain a first indication of a first type of waveform associated with a second apparatus. In some examples, the waveform configuration circuitry 1342 together with the communication and processing circuitry 1341 and the transceiver 1310, shown and described in FIG. 13, may provide a means to obtain a first indication of a first type of waveform associated with a second apparatus.

At block 1404, the user equipment may obtain a downlink transmission based on the first type of waveform from the second apparatus. In some examples, the waveform processing circuitry 1343, shown and described in FIG. 13, may provide a means to obtain a downlink transmission based on the first type of waveform from the second apparatus. In some examples, the waveform processing circuitry 1343 together with the communication and processing circuitry 1341 and the transceiver 1310, shown and described in FIG. 13, may provide a means to obtain a downlink transmission based on the first type of waveform from the second apparatus.

In some examples, the first indication of the first type of waveform specifies at least one of: a particular waveform for the downlink transmission, a waveform parameter for the downlink transmission, a type of precoding for the downlink transmission, or whether transform precoding is used for the downlink transmission. In some examples, the particular waveform may include a discrete Fourier transform-spread-orthogonal frequency division multiplexing (DFT-S-OFDM) waveform, a cyclic prefix-orthogonal frequency division multiplexing (CP-OFDM) waveform, or an orthogonal time frequency space (OTFS) waveform. In some examples, the waveform parameter specifies at least one of: a type of filtering, a type of pulse shaping, a bandwidth expansion factor, or a length of a cyclic prefix. In some examples, the type of precoding may include transform precoding.

In some examples, the first indication of the first type of waveform specifies that the first apparatus is to switch to use of a discrete Fourier transform-spread-orthogonal frequency division multiplexing (DFT-S-OFDM) waveform for obtaining downlink transmissions. In some examples, the first indication of the first type of waveform specifies that the first apparatus is to switch to use of a cyclic prefix-orthogonal frequency division multiplexing (CP-OFDM) waveform for obtaining downlink transmissions.

In some examples, the first apparatus may switch, based on the first indication of the first type of waveform, to use of a discrete Fourier transform-spread-orthogonal frequency division multiplexing (DFT-S-OFDM) waveform for obtaining downlink transmissions. In some examples, the first apparatus may switch, based on the first indication of the first type of waveform, to use of a cyclic prefix-orthogonal frequency division multiplexing (CP-OFDM) waveform for obtaining downlink transmissions.

In some examples, the first indication of the first type of waveform indicates a waveform switch associated with the downlink transmission.

In some examples, the first indication of the first type of waveform indicates a waveform switch associated with an uplink transmission. In some examples, the first apparatus may switch to the first type of waveform to obtain the downlink transmission based on a configuration that specifies that a switch of an uplink waveform is linked to a switch of a downlink waveform.

In some examples, the first apparatus may obtain a radio resource control (RRC) message. In some examples, the RRC message includes the first indication of the first type of waveform.

In some examples, the first apparatus may obtain a medium access control-control element (MAC-CE). In some examples, the MAC-CE includes the first indication of the first type of waveform.

In some examples, the first apparatus may obtain downlink control information (DCI). In some examples, the DCI includes the first indication of the first type of waveform.

In some examples, the DCI may be a group common DCI. In some examples, the first apparatus may identify a particular waveform or waveform parameter to be used to obtain the downlink transmission based on the group common DCI and a configuration. In some examples, the configuration is specified by a wireless communication standard. In some examples, the first apparatus may obtain the configuration from a network entity.

In some examples, the first apparatus may commence using the first type of waveform a defined period of time after obtaining the first indication of the first type of waveform. In some examples, the defined period of time is specified by a wireless communication standard.

In some examples, the first apparatus may obtain a second indication of the defined period of time. In some examples, the first apparatus may output, for transmission, a third indication of a capability of the first apparatus associated with waveform switch timing. In some examples, the second indication is based on the third indication.

In some examples, the first apparatus may receive the first indication of the first type of waveform and the downlink transmission, wherein the first apparatus is configured as a user equipment.

In one configuration, the apparatus 1300 includes means for obtaining a first indication of a first type of waveform associated with a second apparatus, and means for obtaining a downlink transmission based on the first type of waveform from the second apparatus. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1-3, 5, and 9-13, and utilizing, for example, the methods and/or algorithms described herein in relation to FIG. 14.

Figure 15:
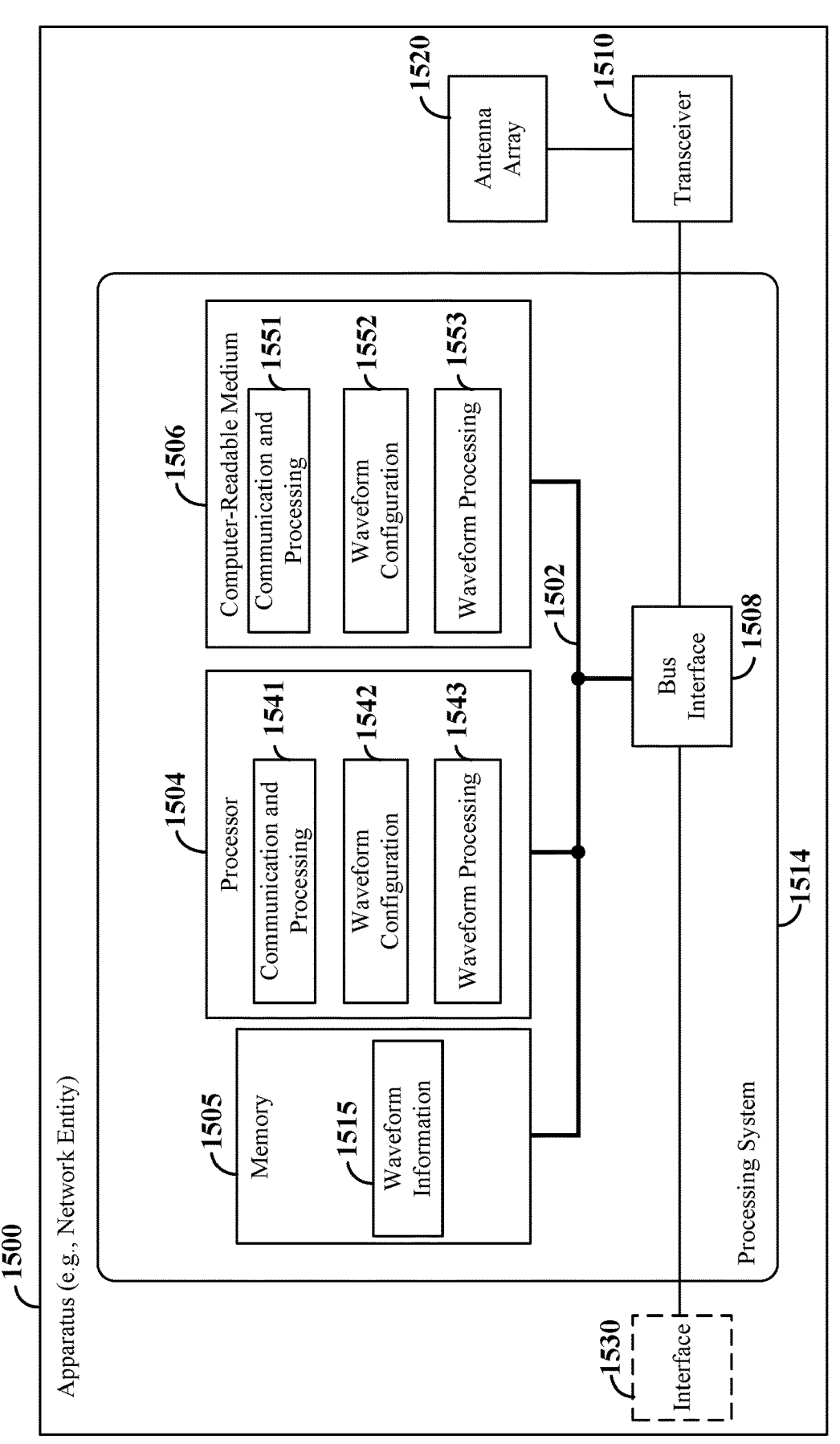
FIG. 15 is a block diagram conceptually illustrating an example of a hardware implementation for an apparatus (e.g., a network entity) employing a processing system according to some aspects.

FIG. 15 is a conceptual diagram illustrating an example of a hardware implementation for an apparatus 1500 employing a processing system 1514. In some implementations, the apparatus 1500 may correspond to any of the base stations, CUs, DUs, RUs, or scheduling entities shown in any of FIGS. 1-3, 5, and 9-12.

In accordance with various aspects of the disclosure, an element, or any portion of an element, or any combination of elements may be implemented with the processing system 1514. The processing system may include one or more processors 1504. The processing system 1514 may be substantially the same as the processing system 1314 illustrated in FIG. 13, including a bus interface 1508, a bus 1502, memory 1505, a processor 1504, a computer-readable medium 1506, a transceiver 1510, and an antenna array 1520. The memory 1505 may store waveform information 1515 (e.g., waveform types and/or waveform parameters) used by the processor 1504 in cooperation with the transceiver 1510 for communication operations as described herein. Furthermore, the apparatus 1500 may include an interface 1530 (e.g., a network interface) that provides a means for communicating with at least one other apparatus within a core network and with at least one radio access network.

The apparatus 1500 may be configured to perform any one or more of the operations described herein (e.g., as described above in conjunction with FIGS. 1-12 and as described below in conjunction with FIG. 16). In some aspects of the disclosure, the processor 1504, as utilized in the apparatus 1500, may include circuitry configured for various functions.

The processor 1504 may be configured to generate, schedule, and modify a resource assignment or grant of time-frequency resources (e.g., a set of one or more resource elements). For example, the processor 1504 may schedule time—frequency resources within a plurality of time division duplex (TDD) and/or frequency division duplex (FDD) subframes, slots, and/or mini-slots to carry user data traffic and/or control information to and/or from multiple scheduled entities. The processor 1504 may be configured to schedule resources for the transmission of downlink signals.

The processor 1504 may further be configured to schedule resources for the transmission of uplink signals.

In some aspects of the disclosure, the processor 1504 may include communication and processing circuitry 1541. The communication and processing circuitry 1541 may be configured to communicate with a user equipment. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

The communication and processing circuitry 1541 may further be configured to receive an indication from the UE. For example, the indication may be included in a MAC-CE carried in a Uu PUSCH or a PSCCH, or included in a Uu RRC message or an SL RRC message, or included in a dedicated Uu PUCCH or PUSCH. The communication and processing circuitry 1541 may further be configured to receive a scheduling request from a UE for an uplink grant or a sidelink grant.

In some implementations wherein the communication involves obtaining (e.g., receiving) information, the communication and processing circuitry 1541 may obtain information from a component of the apparatus 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving (e.g., receiving indications, uplink information, etc.). In some examples, the communication and processing circuitry 1541 may include functionality for a means for decoding. In some examples, the communication and processing circuitry 1541 may include functionality for a means for receiving capability information.

In some implementations wherein the communication involves outputting (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for encoding. In some examples, the communication and processing circuitry 1541 may include functionality for a means for transmitting (e.g., transmitting an indication, a downlink transmission, etc., as discussed herein). In some examples, the communication and processing circuitry 1541 may include functionality for a means for outputting an RRC message (e.g., by sending information on a PDSCH), a MAC-CE (e.g., by sending information on a PDSCH), or DCI (e.g., a group common DCI or other DCI) (e.g., by sending information on a PDCCH).

The processor 1504 may include waveform configuration circuitry 1542 configured to perform waveform configuration-related operations as discussed herein (e.g., one or more of the operations described above in conjunction with FIGS. 8-12). The waveform configuration circuitry 1542 may be configured to execute waveform configuration software 1552 included on the computer-readable medium 1506 to implement one or more functions described herein.

The waveform configuration circuitry 1542 may include functionality for a means for outputting an indication (e.g., as described above in conjunction with FIGS. 8-12). For example, the waveform configuration circuitry 1542 may transmit an RRC message, DCI, or a MAC-CE including an indication of a type of waveform. As another example, the waveform configuration circuitry 1542 may transmit an RRC message, DCI, or a MAC-CE including an indication of a processing period of time associated with downlink waveform switching.

The waveform configuration circuitry 1542 may include functionality for a means for selecting a type of waveform (e.g., as described above in conjunction with FIGS. 8-12). For example, the waveform configuration circuitry 1542 may select a type of waveform (e.g., DFT-S-OFDM, CP-OFDM, etc.) based on a frequency range associated with a downlink transmission. As another example, the waveform configuration circuitry 1542 may select a type of waveform (e.g., DFT-S-OFDM, CP-OFDM, etc.) based on an SCS associated with a downlink transmission. As a further example, the waveform configuration circuitry 1542 may select a type of waveform (e.g., DFT-S-OFDM, CP-OFDM, etc.) based on inter-band interference associated with a frequency channel or band that it to be used for a downlink transmission. As another example, the waveform configuration circuitry 1542 may select a type of waveform (e.g., DFT-S-OFDM, CP-OFDM, etc.) based on inter-symbol interference associated with a frequency channel or band that it to be used for a downlink transmission.

The waveform configuration circuitry 1542 may include functionality for a means for outputting a configuration (e.g., as described above in conjunction with FIGS. 8-12). For example, the waveform configuration circuitry 1542 may transmit an RRC message or a MAC-CE including a configuration that specifies that a switch of an uplink waveform is linked to a switch of a downlink waveform. As another example, the waveform configuration circuitry 1542 may transmit an RRC message or a MAC-CE including a configuration that that maps an indication of a first type of waveform to a particular waveform or waveform parameter.

The waveform configuration circuitry 1542 may include functionality for a means for obtaining an indication (e.g., as described above in conjunction with FIGS. 8-12). For example, the waveform configuration circuitry 1542 may receive an RRC message, DCI, or a MAC-CE including an indication of a capability of an apparatus (e.g., a UE capability associated with downlink waveform switch timing).

The waveform configuration circuitry 1542 may include functionality for a means for selecting a processing period of time (e.g., as described above in conjunction with FIGS. 8-12). For example, the waveform configuration circuitry 1542 may select a processing delay time (e.g., associated with a waveform switch) based on UE capability information (e.g., indicating how quickly the UE can switch waveforms).

The processor 1504 may include waveform processing circuitry 1543 configured to perform waveform processing-related operations as discussed herein (e.g., one or more of the operations described above in conjunction with FIGS. 8-12). The waveform processing circuitry 1543 may be configured to execute waveform processing software 1553 included on the computer-readable medium 1506 to implement one or more functions described herein.

The waveform processing circuitry 1543 may include functionality for a means for outputting a downlink transmission that is based on a type of waveform (e.g., as described above in conjunction with FIGS. 8-12). For example, the waveform processing circuitry 1543 may transmit downlink data via a PDSCH.

In some examples, the apparatus 1500 shown and described above in connection with FIG. 15 may be a disaggregated base station. For example, the apparatus 1500 shown in FIG. 15 may include the CU and optionally one or more DUs/RUs of the disaggregated base station. Other DUs/RUs associated with the apparatus 1500 may be distributed throughout the network. In some examples, the DUs/RUs may correspond to TRPs associated with the network entity. In some examples, the CU and/or DU/RU of the disaggregated base station (e.g., within the apparatus 1500) may generate at least one indication (e.g., of a waveform switch) and provide the at least one indication to a user equipment.

Figure 16:
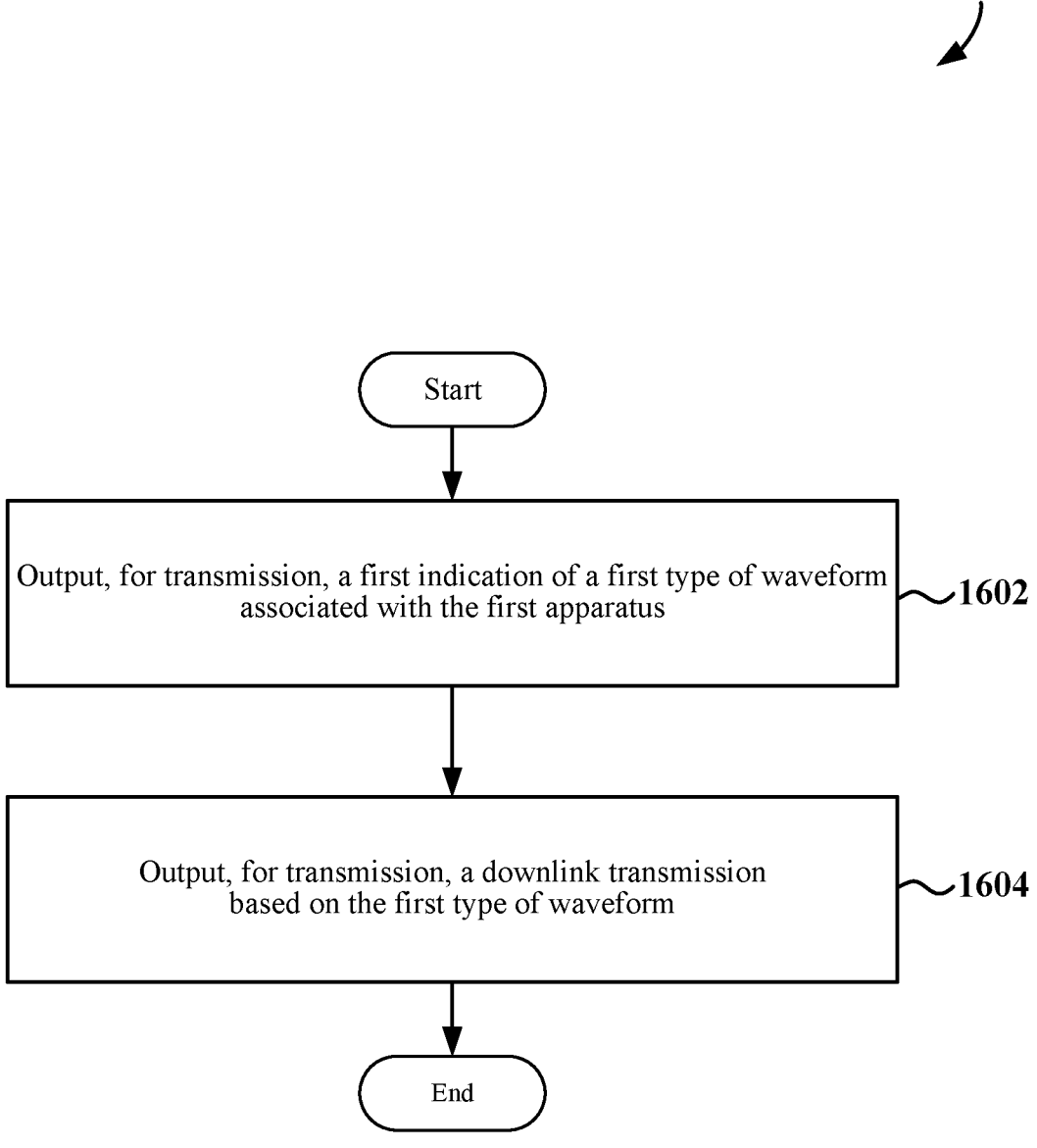
FIG. 16 is a flow chart illustrating an example wireless communication method involving outputting an indication of a type of waveform according to some aspects.

FIG. 16 is a flow chart illustrating an example method 1600 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1600 may be carried out by the apparatus 1500 illustrated in FIG. 15. In some examples, the method 1600 may be carried out by any suitable apparatus or means for carrying out the functions or algorithm described below.

At block 1602, a network entity may output, for transmission, a first indication of a first type of waveform associated with the first apparatus. In some examples, the waveform configuration circuitry 1542, shown and described in FIG. 15, may provide a means to output, for transmission, a first indication of a first type of waveform associated with the first apparatus. In some examples, the waveform configuration circuitry 1542 together with the communication and processing circuitry 1541 and the transceiver 1510, shown and described in FIG. 15, may provide a means to output, for transmission, a first indication of a first type of waveform associated with the first apparatus.

At block 1604, the network entity may output, for transmission, a downlink transmission based on the first type of waveform. In some examples, the waveform processing circuitry 1543, shown and described in FIG. 15, may provide a means to output, for transmission, a downlink transmission based on the first type of waveform. In some examples, the waveform processing circuitry 1543 together with the communication and processing circuitry 1541 and the transceiver 1510, shown and described in FIG. 15, may provide a means to output, for transmission, a downlink transmission based on the first type of waveform.

In some examples, the first indication of the first type of waveform specifies at least one of a particular waveform for the downlink transmission, a waveform parameter for the downlink transmission, a type of precoding for the downlink transmission, or whether transform precoding is used for the downlink transmission. In some examples, the particular waveform may include a discrete Fourier transform-spread-orthogonal frequency division multiplexing (DFT-S-OFDM) waveform, a cyclic prefix-orthogonal frequency division multiplexing (CP-OFDM) waveform, or an orthogonal time frequency space (OTFS) waveform. In some examples, the waveform parameter specifies at least one of a type of filtering, a type of pulse shaping, a bandwidth expansion factor, or a length of a cyclic prefix. In some examples, the type of precoding may include transform precoding.

In some examples, the first indication of the first type of waveform specifies that a second apparatus is to switch to use of a discrete Fourier transform-spread-orthogonal frequency division multiplexing (DFT-S-OFDM) waveform for obtaining downlink transmissions. In some examples, the first indication of the first type of waveform specifies that a second apparatus is to switch to use of a cyclic prefix-orthogonal frequency division multiplexing (CP-OFDM) waveform for obtaining downlink transmissions.

In some examples, the first apparatus may select the first type of waveform based on a frequency range associated with the downlink transmission. In some examples, the first apparatus may select the first type of waveform based on a sub-carrier spacing associated with the downlink transmission.

In some examples, the first indication of the first type of waveform may include at least one waveform parameter. In some examples, the first apparatus may select the at least one waveform parameter based on at least one of inter-band interference or inter-symbol interference.

In some examples, the first apparatus may output, for transmission, a configuration that specifies that a switch of an uplink waveform is linked to a switch of a downlink waveform. In some examples, the first indication of the first type of waveform indicates a waveform switch associated with an uplink transmission.

In some examples, the first apparatus may output, for transmission, at least one configuration for at least one user equipment that maps the first indication of the first type of waveform to a particular waveform or waveform parameter. In some examples, the first apparatus may output, for transmission, group common downlink control information (DCI). In some examples, the group common DCI includes the first indication of the first type of waveform.

In some examples, the first apparatus may output, for transmission to a second apparatus, a second indication of a processing period of time associated with downlink waveform switching. In some examples, the first apparatus may obtain a third indication of a capability of the second apparatus associated with downlink waveform switch timing. In some examples, the first apparatus may select the processing period of time based on the third indication of the capability of the second apparatus.

In some examples, the first apparatus may transmit the first indication of the first type of waveform and the downlink transmission, wherein the first apparatus is configured as a network entity.

In one configuration, the apparatus 1500 includes means for outputting, for transmission, a first indication of a first type of waveform associated with the first apparatus, and means for outputting, for transmission, a downlink transmission based on the first type of waveform. In one aspect, the aforementioned means may be the processor 1504 shown in FIG. 15 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one or more of FIGS. 1-3, 5, 9-12, and 15, and utilizing, for example, the methods and/or algorithms described herein in relation to FIG. 16.

The methods shown in FIGS. 14 and 16 may include additional aspects, such as any single aspect or any combination of aspects described below and/or in connection with one or more other processes described elsewhere herein. The following provides an overview of several aspects of the present disclosure.

Aspect 1: A method for communication at a first apparatus, the method comprising: obtaining a first indication of a first type of waveform associated with a second apparatus; and obtaining a downlink transmission based on the first type of waveform from the second apparatus.

Aspect 2: The method of aspect 1, wherein the first indication of the first type of waveform specifies at least one of: a particular waveform for the downlink transmission, a waveform parameter for the downlink transmission, a type of precoding for the downlink transmission, or whether transform precoding is used for the downlink transmission.

Aspect 3: The method of aspect 2, wherein the particular waveform comprises a discrete Fourier transform-spread-orthogonal frequency division multiplexing (DFT-S-OFDM) waveform, a cyclic prefix-orthogonal frequency division multiplexing (CP-OFDM) waveform, or an orthogonal time frequency space (OTFS) waveform.

Aspect 4: The method of any of aspects 2 through 3, wherein the waveform parameter specifies at least one of: a type of filtering, a type of pulse shaping, a bandwidth expansion factor, or a length of a cyclic prefix.

Aspect 5: The method of any of aspects 2 through 4, wherein the type of precoding comprises transform precoding.

Aspect 6: The method of any of aspects 1 through 5, further comprising: switching, based on the first indication of the first type of waveform, to use of a discrete Fourier transform-spread-orthogonal frequency division multiplexing (DFT-S-OFDM) waveform for obtaining downlink transmissions; or switching, based on the first indication of the first type of waveform, to use of a cyclic prefix-orthogonal frequency division multiplexing (CP-OFDM) waveform for obtaining downlink transmissions.

Aspect 7: The method of any of aspects 1 through 6, wherein the first indication of the first type of waveform indicates a waveform switch associated with the downlink transmission.

Aspect 8: The method of any of aspects 1 through 6, wherein: the first indication of the first type of waveform indicates a waveform switch associated with an uplink transmission; and the method further comprises switching to the first type of waveform to obtain the downlink transmission based on a configuration that specifies that a switch of an uplink waveform is linked to a switch of a downlink waveform.

Aspect 9: The method of any of aspects 1 through 8, wherein: the method further comprises obtaining a radio resource control (RRC) message; and the RRC message includes the first indication of the first type of waveform.

Aspect 10: The method of any of aspects 1 through 8, wherein: the method further comprises obtaining a medium access control-control element (MAC-CE); and the MAC-CE includes the first indication of the first type of waveform.

Aspect 11: The method of any of aspects 1 through 8, wherein: the method further comprises obtaining downlink control information (DCI); and the DCI includes the first indication of the first type of waveform.

Aspect 12: The method of aspect 11, wherein: the DCI comprises a group common DCI; and the method further comprises identifying a particular waveform or waveform parameter to be used to obtain the downlink transmission based on the group common DCI and a configuration.

Aspect 13: The method of aspect 12, wherein the configuration is specified by a wireless communication standard.

Aspect 14: The method of aspect 12, further comprising: obtaining the configuration from a network entity via the interface.

Aspect 15: The method of any of aspects 1 through 14, further comprising: commencing using the first type of waveform a defined period of time after obtaining the first indication of the first type of waveform.

Aspect 16: The method of aspect 15, wherein the defined period of time is specified by a wireless communication standard.

Aspect 17: The method of aspect 15, further comprising: obtaining a second indication of the defined period of time from the second apparatus.

Aspect 18: The method of aspect 17, wherein: the method further comprises outputting, for transmission, a third indication of a capability of the first apparatus associated with waveform switch timing; and the second indication is based on the third indication.

Aspect 19: The method of aspect 16, further comprising: receiving the first indication of the first type of waveform and the downlink transmission from the second apparatus, wherein the first apparatus is configured as a user equipment.

Aspect 21: A method for communication at a first apparatus, the method comprising: outputting, for transmission, a first indication of a first type of waveform associated with the first apparatus; and outputting, for transmission, a downlink transmission based on the first type of waveform.

Aspect 22: The method of aspect 21, wherein the first indication of the first type of waveform specifies at least one of: a particular waveform for the downlink transmission, a waveform parameter for the downlink transmission, a type of precoding for the downlink transmission, or whether transform precoding is used for the downlink transmission.

Aspect 23: The method of any of aspects 21 through 22, further comprising: selecting the first type of waveform based on a frequency range associated with the downlink transmission.

Aspect 24: The method of any of aspects 21 through 23, further comprising: selecting the first type of waveform based on a sub-carrier spacing associated with the downlink transmission.

Aspect 25: The method of any of aspects 21 through 24, wherein: the first indication of the first type of waveform comprises at least one waveform parameter; and the method further comprises selecting the at least one waveform parameter based on at least one of: inter-band interference or inter-symbol interference.

Aspect 26: The method of any of aspects 21 through 25, wherein: the method further comprises outputting, for transmission, a configuration that specifies that a switch of an uplink waveform is linked to a switch of a downlink waveform; and the first indication of the first type of waveform indicates a waveform switch associated with an uplink transmission.

Aspect 27: The method of any of aspects 21 through 26, wherein: the method further comprises outputting, for transmission, at least one configuration for at least one user equipment that maps the first indication of the first type of waveform to a particular waveform or waveform parameter; the method further comprises outputting, for transmission, group common downlink control information (DCI); and the group common DCI includes the first indication of the first type of waveform.

Aspect 28: The method of any of aspects 21 through 27, further comprising: outputting, for transmission to a second apparatus, a second indication of a processing period of time associated with downlink waveform switching.

Aspect 29: The method of aspect 28, further comprising: obtaining a third indication of a capability of the second apparatus associated with downlink waveform switch timing; and selecting the processing period of time based on the third indication of the capability of the second apparatus.

Aspect 30: The method of any of aspects 21 through 29, further comprising: transmitting the first indication of the first type of waveform and the downlink transmission, wherein the first apparatus is configured as a network entity.

Aspect 31: A user equipment, comprising: at least one transceiver; a memory comprising instructions; and one or more processors configured to execute the instructions and cause the user equipment to perform a method in accordance with any one or more of aspects 1-18, wherein the at least one transceiver is configured to transmit the fourth signal.

Aspect 32: A first apparatus configured for communication comprising at least one means for performing any one or more of aspects 1 through 19.

Aspect 33: A non-transitory computer-readable medium storing computer-executable code, comprising code for causing a first apparatus to perform any one or more of aspects 1 through 19.

Aspect 34: A network entity, comprising: at least one transceiver; a memory comprising instructions; and one or more processors configured to execute the instructions and cause the network entity to perform a method in accordance with any one or more of aspects 21-29, wherein the at least one transceiver is configured to receive the first signal.

Aspect 35: A first apparatus configured for communication comprising at least one means for performing any one or more of aspects 21 through 30.

Aspect 36: A non-transitory computer-readable medium storing computer-executable code, comprising code for causing a first apparatus to perform any one or more of aspects 21 through 30.

Aspect 37: A first apparatus, comprising: a memory comprising instructions; and one or more processors configured to execute the instructions and cause the first apparatus to perform a method in accordance with any one or more of aspects 1-18.

Aspect 38: A first apparatus, comprising: a memory comprising instructions; and one or more processors configured to execute the instructions and cause the first apparatus to perform a method in accordance with any one or more of aspects 21-29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 5, 9-13, and 15 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first apparatus for communication, comprising:
at least one transceiver;
a processing system comprising one or more processors and one or more memory devices and configured to:
receive, via the at least one transceiver and from a second apparatus, a first indication of a waveform switch from a first type of waveform to a second type of waveform associated with an uplink transmission, wherein the first indication of the waveform switch specifies: whether a discrete Fourier transform-spread-orthogonal frequency division multiplexing (DFT-S-OFDM) waveform is used for the uplink transmission, whether a cyclic prefix-OFDM (CP-OFDM) waveform is used for the uplink transmission, whether an orthogonal time frequency space (OTFS) waveform is used for the uplink transmission, a type of precoding used for the uplink transmission, or whether transform precoding is used for the uplink transmission; and
receive, via the at least one transceiver and from the second apparatus, a downlink transmission after the first indication of the waveform switch is received, wherein to received the downlink transmission, the processing system is further configured to decode the downlink transmission based on the second type of waveform according to a configuration that specifies that a switch of an uplink waveform is linked to a switch of a downlink waveform.

2. The first apparatus of claim 1, wherein the first indication further specifies, for the uplink transmission, at least one of: a type of filtering, a type of pulse shaping, or a length of a cyclic prefix.

3. The first apparatus of claim 1, wherein the type of precoding comprises transform precoding.

4. The first apparatus of claim 1, wherein the processing system is further configured to:

switch, after the first indication of the waveform switch is received, to use the DFT-S-OFDM waveform; or switch, after the first indication of the waveform switch is received, to use the CP-OFDM waveform.

5. The first apparatus of claim 1, wherein:

the processing system is further configured to receive a radio resource control (RRC) message; and the RRC message includes the first indication of the waveform switch.

6. The first apparatus of claim 1, wherein:

the processing system is further configured to receive a medium access control-control element (MAC-CE); and the MAC-CE includes the first indication of the first type of waveform switch.

7. The first apparatus of claim 1, wherein:

the processing system is further configured to receive downlink control information (DCI); and the DCI includes the first indication of the waveform switch.

8. The first apparatus of claim 7, wherein:

the DCI comprises a group common DCI; and the processing system is further configured to identify a particular waveform or waveform parameter to be used to receive the downlink transmission based on the group common DCI and a configuration.

9. The first apparatus of claim 8, wherein the configuration is specified by a wireless communication standard.

10. The first apparatus of claim 8, wherein the processing system is further configured to:

receive, via the at least one transceiver, the configuration from a network entity.

11. The first apparatus of claim 1, wherein the processing system is further configured to:

commence using the second type of waveform a defined period of time after obtaining the first indication of the waveform switch.

12. The first apparatus of claim 11, wherein the defined period of time is specified by a wireless communication standard.

13. The first apparatus of claim 11, wherein the processing system is further configured to:

receive, via the at least one transceiver, a second indication of the defined period of time from the second apparatus.

14. The first apparatus of claim 13, wherein:

the processing system is further configured to transmit, via the at least one transceiver, a third indication of a capability of the first apparatus associated with waveform switch timing; and the second indication is based on the third indication.

15. The first apparatus of claim 1, wherein the first apparatus is configured as a user equipment.

16. A method for communication by a wireless node, the method comprising:

receiving, from a second apparatus, a first indication of a waveform switch from a first type of waveform to a second type of waveform associated with an uplink transmission, wherein the first indication of the waveform switch specifies:

whether a discrete Fourier transform-spread-orthogonal frequency division multiplexing (DFT-S-OFDM) waveform is used for the uplink transmission, whether a cyclic prefix-OFDM (CP-OFDM) waveform is used for the uplink transmission, whether an orthogonal time frequency space (OTFS) waveform is used for the uplink transmission, a type of precoding used for the uplink transmission, or whether transform precoding is used for the uplink transmission; and receiving, from the second apparatus and via radio-frequency signaling, a downlink transmission after the first indication of the waveform switch is received, wherein receiving the downlink transmission comprises decoding the downlink transmission based on the second type of waveform according to a configuration that specifies that a switch of an uplink waveform is linked to a switch of a downlink waveform.

17. A first apparatus for communication, comprising:

at least one transceiver;

a processing system comprising one or more processors and one or more memory devices and configured to:

transmit, via the at least one transceiver, a first indication of a waveform switch from a first type of waveform to a second type of waveform associated with an uplink transmission, wherein the first indication of the waveform switch specifies: whether a discrete Fourier transform—spread—orthogonal frequency division multiplexing (DFT-S-OFDM) waveform is used for the uplink transmission, whether a cyclic prefix-OFDM (CP-OFDM) waveform is used for the uplink transmission, whether an orthogonal time frequency space (OTFS) waveform is used for the uplink transmission, a type of precoding used for the uplink transmission, or whether transform precoding is used for the uplink transmission; and encode the downlink transmission based on the second type of waveform according to a configuration that specifies that a switch of an uplink waveform is linked to a switch of a downlink waveform; and transmit, via the at least one transceiver, the encoded downlink transmission after the first indication of the waveform switch is transmitted.

18. The first apparatus of claim 17, wherein the processing system is further configured to:

select the second type of waveform based on a frequency range associated with the uplink transmission.

19. The first apparatus of claim 17, wherein the processing system is further configured to:

select the second type of waveform based on a sub-carrier spacing associated with the uplink transmission.

20. The first apparatus of claim 17, wherein:

the first indication of the waveform switch comprises at least one waveform parameter; and the processing system is further configured to select the at least one waveform parameter based on at least one of: inter-band interference or inter-symbol interference.

21. The first apparatus of claim 17, wherein:

the processing system is further configured to transmit, via the at least one transceiver, the configuration that specifies that the switch of the uplink waveform is linked to the switch of the downlink waveform.

22. The first apparatus of claim 17, wherein:

the processing system is further configured to transmit, via the at least one transceiver, at least one configuration for at least one user equipment that maps the second type of waveform to a particular waveform or waveform parameter;

the processing system is further configured to transmit, via the at least one transceiver, group common downlink control information (DCI); and the group common DCI includes the first indication of the waveform switch.

23. The first apparatus of claim 17, wherein the processing system is further configured to:

transmit, via the at least one transceiver and to a second apparatus, a second indication of a processing period of time associated with downlink waveform switching.

24. The first apparatus of claim 23, wherein the processing system is further configured to:

receive, via the at least one transceiver, a third indication of a capability of the second apparatus associated with downlink waveform switch timing; and select the processing period of time based on the third indication of the capability of the second apparatus.

25. The first apparatus of claim 17, wherein the first apparatus is configured as a network entity.

* * * * *